United States Patent
Walker

(12)
(10) Patent No.: US 6,322,192 B1
(45) Date of Patent: Nov. 27, 2001

(54) MULTI-FUNCTION OPTICAL SENSING SYSTEM FOR INKJET PRINTING

(75) Inventor: Steven H. Walker, Camas, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/183,086

(22) Filed: Oct. 29, 1998

Related U.S. Application Data

(63) Continuation-in-part of application No. 08/885,486, filed on Jun. 30, 1997, now Pat. No. 6,036,298.

(51) Int. Cl.[7] ............................................. B41J 29/393
(52) U.S. Cl. .......................... 347/19; 356/416; 356/419
(58) Field of Search ............................. 347/19; 250/226; 356/416, 419

(56) References Cited

U.S. PATENT DOCUMENTS

| | | | |
|---|---|---|---|
| 5,130,531 | 7/1992 | Ito et al. ............................. | 250/216 |
| 5,262,797 | 11/1993 | Boeller et al. ...................... | 346/1.1 |
| 5,336,714 | * 8/1994 | Krutak et al. ....................... | 524/608 |
| 5,404,020 | 4/1995 | Cobbs .................................. | 347/19 |
| 5,463,648 | 10/1995 | Gibbs .................................. | 372/38 |
| 5,488,223 | * 1/1996 | Austin et al. ....................... | 347/19 |
| 5,671,059 | * 9/1997 | Vincent .............................. | 250/226 |
| 5,724,259 | * 3/1998 | Seymour et al. ................... | 364/526 |
| 5,929,432 | * 7/1999 | Yamakawa ......................... | 250/226 |

FOREIGN PATENT DOCUMENTS

| | | | | |
|---|---|---|---|---|
| 0292957A2 | 11/1988 | (EP) | ............................ | H01L/33/00 |
| 0441965A1 | * 8/1991 | (EP) | ............................ | H01L/33/00 |
| 5338199 | 12/1993 | (JP) | ............................ | B41J/2/175 |
| 7314859 | 12/1995 | (JP) | ............................ | B41J/29/46 |

* cited by examiner

*Primary Examiner*—John Barlow
*Assistant Examiner*—Julian D. Huffman
(74) *Attorney, Agent, or Firm*—Flory L. Martin

(57) ABSTRACT

A multi-function optical sensing system is provided for determining the presence, color and location of ink droplets printed by printheads in a printzone of an inkjet printing mechanism, and for determining the media type from indicia printed on media indicative of the media type. Printhead carriage and media advance encoders provide input signals that are used in conjunction with signals received from a multi-function optical sensor that the carriage scans across the printzone to illuminate selected portions of the media. The spectral reflectance of the illuminate media is used to determine the ink color or hue when illuminated by a blue light emitting diode (LED) of the sensor, and to interpret the media type indicia when illuminated by a red LED. An inkjet printing mechanism having such a multi-function optical sensing system is also provided, along with a method of sensing ink droplets printed on media in such an inkjet printing mechanism.

13 Claims, 15 Drawing Sheets

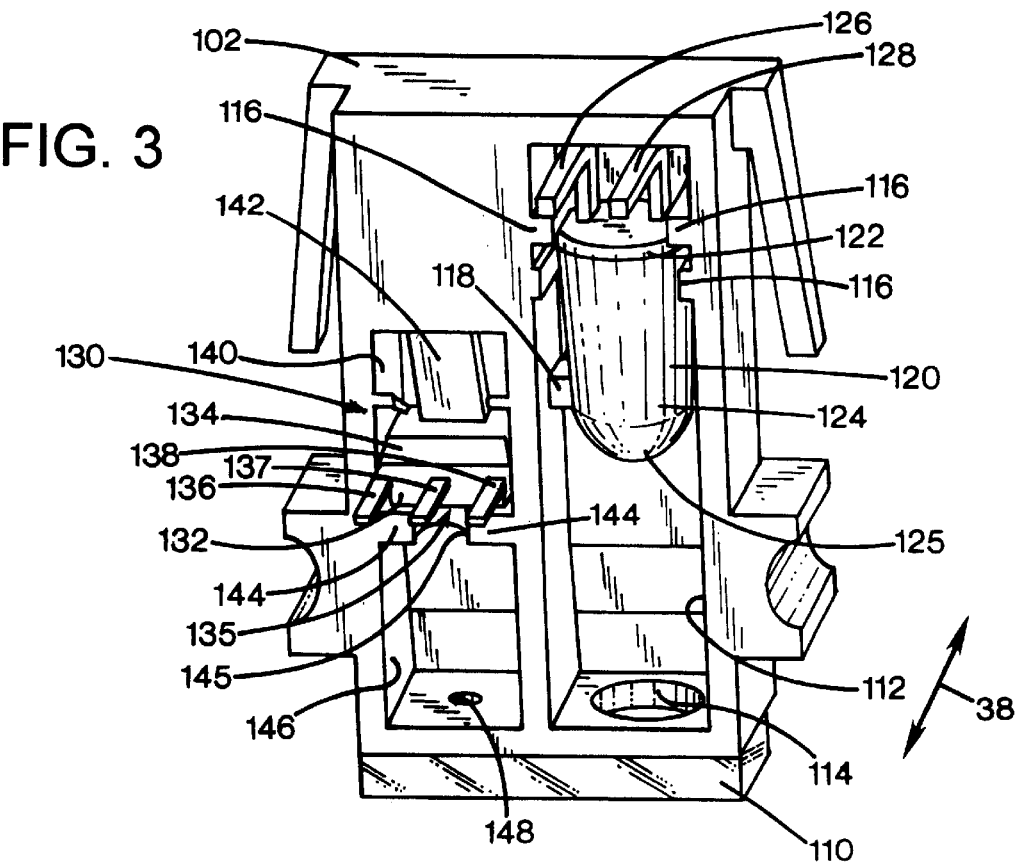
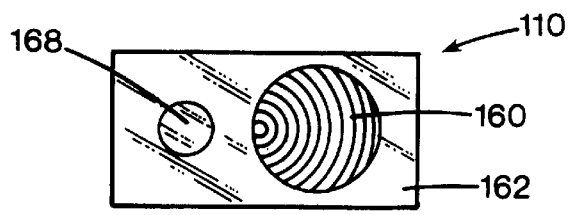
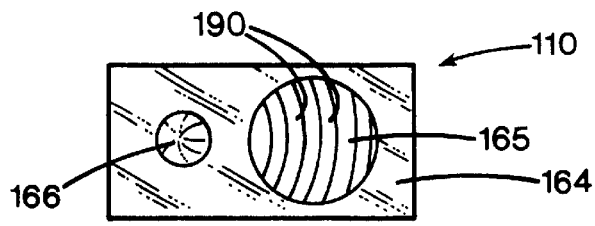
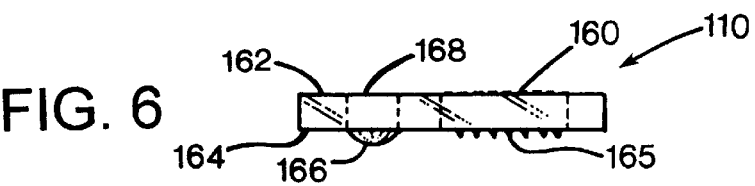

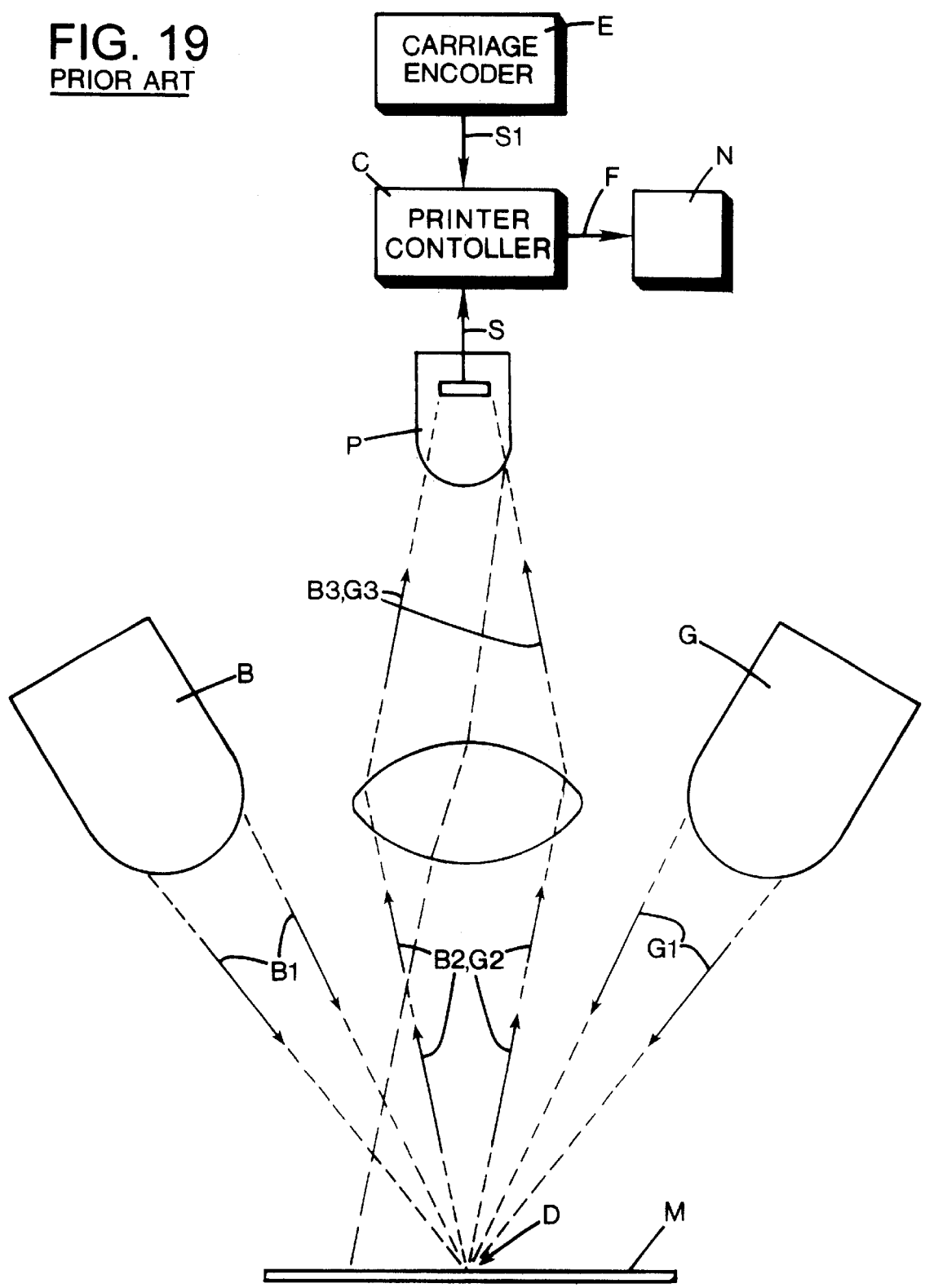

MULTI-FUNCTION OPTICAL SENSING SYSTEM FOR INKJET PRINTING

RELATED APPLICATIONS

This is a continuation-in-part application of the U.S. patent application Ser. No. 08/885,486, filed on Jun. 30, 1997, now U.S. Pat. No. 6,036,298 both having the same inventor.

FIELD OF THE INVENTION

The present invention relates generally to inkjet printing mechanisms, and more particularly to a multi-function optical sensing system for determining information about ink droplets printed on media, and for determining information about the type of print media (e.g. transparencies, plain paper or photographic paper), so the printing mechanism can adjust future printing for optimal images on the specific type of media used.

BACKGROUND OF THE INVENTION

Inkjet printing mechanisms use cartridges, often called "pens," which shoot drops of liquid colorant, referred to generally herein as "ink," onto a page. Each pen has a printhead formed with very small nozzles through which the ink drops are fired. To print an image, the printhead is propelled back and forth across the page, shooting drops of ink in a desired pattern as it moves. The particular ink ejection mechanism within the printhead may take on a variety of different forms known to those skilled in the art, such as those using piezo-electric or thermal printhead technology. For instance, two earlier thermal ink ejection mechanisms are shown in U.S. Pat. Nos. 5,278,584 and 4,683,481, both assigned to the present assignee, Hewlett-Packard Company. In a thermal system, a barrier layer containing ink channels and vaporization chambers is located between a nozzle orifice plate and a substrate layer. This substrate layer typically contains linear arrays of heater elements, such as resistors, which are energized to heat ink within the vaporization chambers. Upon heating, an ink droplet is ejected from a nozzle associated with the energized resistor. By selectively energizing the resistors as the printhead moves across the page, the ink is expelled in a pattern on the print media to form a desired image (e.g., picture, chart or text).

To clean and protect the printhead, typically a "service station" mechanism is mounted within the printer chassis so the printhead can be moved over the station for maintenance. For storage, or during non-printing periods, the service stations usually include a capping system which hermetically seals the printhead nozzles from contaminants and drying. Some caps are also designed to facilitate priming by being connected to a pumping unit that draws a vacuum on the printhead. During operation, clogs in the printhead are periodically cleared by firing a number of drops of ink through each of the nozzles in a process known as "spitting," with the waste ink being collected in a "spittoon" reservoir portion of the service station. After spitting, uncapping, or occasionally during printing, most service stations have an elastomeric wiper that wipes the printhead surface to remove ink residue, as well as any paper dust or other debris that has collected on the printhead.

To print an image, the printhead is scanned back and forth across a printzone above the sheet, with the pen shooting drops of ink as it moves. By selectively energizing the resistors as the printhead moves across the sheet, the ink is expelled in a pattern on the print media to form a desired image (e.g., picture, chart or text). The nozzles are typically arranged in linear arrays usually located side-by-side on the printhead, parallel to one another, and perpendicular to the scanning direction, with the length of the nozzle arrays defining a print swath or band. That is, if all the nozzles of one array were continually fired as the printhead made one complete traverse through the printzone, a band or swath of ink would appear on the sheet. The width of this band is known as the "swath width" of the pen, the maximum pattern of ink which can be laid down in a single pass. The media is moved through the printzone, typically one swath width at a time, although some print schemes move the media incrementally by for instance, halves or quarters of a swath width for each printhead pass to obtain a shingled drop placement which enhances the appearance of the final image.

Inkjet printers designed for the home market often have a variety of conflicting design criteria. For example, the home market dictates that an inkjet printer be designed for high volume manufacture and delivery at the lowest possible cost, with better than average print quality along with maximized ease of use. With continuing increases in printer performance, the challenge of maintaining a balance between these conflicting design criteria also increases. For example, printer performance has progressed to the point where designs are being considered that use four separate monochromatic printheads, resulting in a total of over 1200 nozzles that produce ink drops so small that they approximate a mist.

Such high resolution printing requires very tight manufacturing tolerances on these new pens; however, maintaining such tight tolerances is often difficult when also trying to achieve a satisfactory manufacturing yield of the new pens. Indeed, the attributes which enhance pen performance dictate even tighter process controls, which unfortunately result in a lower pen yield as pens are scrapped out because they do not meet these high quality standards. To compensate for high scrap-out rates, the cost of the pens which are ultimately sold is increased. Thus, it would be desirable to find a way to economically control pens with slight deviations without sacrificing print quality, resulting in higher pen yields (a lower scrap-out rate) and lower prices for consumers.

Moreover, the multiple number of pens in these new printer designs, as well as the microscopic size of their ink droplets, has made it unreasonable to expect consumers to perform any type of pen alignment procedure. In the past, earlier printers having larger drop volumes printed a test pattern for the consumer to review and then select the optimal pen alignment pattern. Unfortunately, the individual small droplets of the new pens are difficult to see, and the fine pitch of the printhead nozzles, that is, the greater number of dots per inch ("dpi" rating) laid down during printing, further increases the difficulty of this task. From this predicament, where advances in print quality have rendered consumer pen alignment to be a nearly impossible task, evolved the concept of closed-loop inkjet printing.

In closed loop inkjet printing, sensors are used to determine a particular attribute of interest, with the printer then using the sensor signal as an input to adjust the particular attribute. For pen alignment, a sensor may be used to measure the position of ink drops produced from each printhead. The printer then uses this information to adjust the timing of energizing the firing resistors to bring the resulting droplets into alignment. In such a closed loop system, user intervention is no longer required, so ease of use is maximized.

Closed loop inkjet printing may also increase pen yield, by allowing the printer to compensate for deviations between individual pens, which otherwise would have been scrapped out as failing to meet tight quality control standards. Drop volume is a good example of this type of trade-off. In the past, to maintain hue control the specifications for drop volume had relatively tight tolerances. In a closed loop system, the actual color balance may be monitored and then compensated with the printer firing control system. Thus, the design tolerances on the drop volume may be loosened, allowing more pens to pass through quality control which increases pen yield. A higher pen yield benefits consumers by allowing manufacturers to produce higher volumes, which results in lower pen costs for consumers.

In the past, closed loop inkjet printing systems have been too costly for the home printer market, although they have proved feasible on higher end products. For example, in the DesignJet® 755 inkjet plotter, and the HP Color Copier 210 machine, both produced by the Hewlett-Packard Company of Palo Alto, Calif., the pens have been aligned using an optical sensor. The DesignJet® 755 plotter used an optical sensor which may be purchased from the Hewlett-Packard Company of Palo Alto, Calif., as part no. C3195-60002, referred to herein as the "HP '002" sensor. The HP Color Copier 210 machine uses an optical sensor which may be purchased from the Hewlett-Packard Company as part no. C5302-60014, referred to herein as the "HP '014" sensor. The HP '014 sensor is similar in function to the HP '002 sensor, but the HP '014 sensor uses an additional green light emitting diode (LED) and a more product-specific packaging to better fit the design of the HP Color Copier 210 machine. Both of these higher end machines have relatively low production volumes, but their higher market costs justify the addition of these relatively expensive sensors.

FIG. 19 is a schematic diagram illustrating the optical construction of the HP '002 sensor, with the HP '014 sensor differing from the HP '002 sensor primarily in signal processing. The HP '014 sensor uses two green LEDs to boost the signal level, so no additional external amplification is needed. Additionally, a variable DC (direct current) offset is incorporated into the HP '014 system to compensate for signal drift. The HP '002 sensor has a blue LED B which generates a blue light B1, and a green LED G which generates a green light G1, whereas the HP '014 sensor (not shown) uses two green LEDs. The blue light stream B1 and the green light stream G1 impact along location D on print media M, and then reflect off the media M as light rays B2 and G2 through a lens L, which focuses this light as rays B3 and G3 for receipt by a photodiode P.

Upon receiving the focused light B3 and G3, the photodiode P generates a sensor signal S which is supplied to the printer controller C. In response to the photodiode sensor signal S, and positional data S1 received from an encoder E on the printhead carriage or on the media advance roller (not shown), the printer controller C adjusts a firing signal F sent to the printhead resistors adjacent nozzles N, to adjust the ink droplet output. Due to the spectral reflectance of the colored inks, the blue LED B is used to detect the presence of yellow ink on the media M, whereas the green LED G is used to detect the presence of cyan and magenta ink, with either diode being used to detect black ink. Thus, the printer controller C, given the input signal S from the photodiode P, in combination with encoder position signal S1 from the encoder E, can determine whether a dot or group of dots landed at a desired location in a test pattern printed on the media M.

Historically, blue LEDs have been weak illuminators. Indeed, the designers of the DesignJet® 755 plotter went to great lengths in signal processing strategies to compensate for this frail blue illumination. The HP Color Copier 210 machine designers faced the same problem and decided to forego directly sensing yellow ink, instead using two green LEDs with color mixing for yellow detection. While brighter blue LEDs have been available in the past, they were prohibitively expensive, even for use in the lower volume, high-end products. For example, the blue LED used in the HP '002 sensor had an intensity of 15 mcd ("milli-candles"). To increase the sensor signal from this dim blue light source, a 100× amplifier was required to boost this signal by 100 times. However, since the amplifier was external to the photodiode portion of the HP '002 sensor, this amplifier configuration was susceptible to propagated noise. Moreover, the offset imposed by this 100× amplifier further complicated the signal processing by requiring that the signal be AC (alternating current) coupled. Additionally, a 10-bit A/D (analog-to-digital) signal converter was needed to obtain adequate resolution with this still relatively low signal.

The HP '014 sensor used in the HP Color Copier 210 machine includes the same optics as the HP '002 sensor used in the DesignJet® 755 plotter, however, the HP '014 sensor is more compact, tailored for ease in assembly, and is roughly 40% the size of the HP '002 sensor. Both the HP '002 and '014 sensors are non-pulsed DC (direct current) sensors, that is, the LEDs are turned on and remain on through the entire scan of the sensor across the media. Signal samples are spatially triggered by the state changes of the encoder strip, which provides feedback to the printer controller about the carriage position across the scan. At the relatively low carriage speed used for the optical scanning, the time required to sample the data is small compared to the total time between each encoder state change. To prevent overheating the LEDs during a scan, the DC forward current through the LED is limited. Since illumination increases with increasing forward current, this current limitation to prevent overheating constrains the brightness of the LED to a value less than the maximum possible.

The HP '014 sensor designers avoided the blue LED problem by using a new way to detect yellow ink with green LEDs. Specifically, yellow ink was detected by placing drops of magenta ink on top of a yellow ink bar when performing a pen alignment routine. The magenta ink migrates through yellow ink to the edges of the yellow bar to change spectral reflectance of the yellow bar so the edges of the bar can be detected when illuminated by the green LEDs. Unfortunately, this yellow ink detection scheme has results which are media dependent. That is, the mixing of the two inks (magenta and yellow) is greatly influenced by the surface properties of media. For use in the home printer market, the media may range from a special photo quality glossy paper, down to a brown lunch sack, fabric, or anything in between. While minimum ink migration may occur on the glossy, photo-type media, a high degree of migration will occur through the paper sack or fabric. Thus, ink mixing to determine drop placement becomes quite risky in the home market, because these earlier printers had no way of knowing which type of media had been used during the pen alignment routine.

To address this media identification problem, a media detect sensor was placed adjacent to the media path through the printer, such as on the media pick pivoting mechanism or on the media input tray. The media detect sensor reads an invisible-ink code pre-printed on the media. This code enables the printer to compensate for the orientation, size and type of media by adjusting print modes for optimum print quality to compensate for these variances in the media supply, without requiring any customer intervention. Both the drop detect and media detect sensors use a light-to-voltage (LVC) converter and one or more light emitting diodes (LED), with each sensor being dependent on a housing to orient the optical elements and shield the LVC from ambient light. In an effort to provide consumers with economical inkjet printing mechanisms that produce high quality images, the costs associated with implementing both sensors were analyzed. Surprisingly, a substantial portion of the cost of both sensors is not related to the sensing unit itself, but instead, is a function of the costs associated with interconnecting the sensors to the printer controller and keeping a greater number of distinct parts in inventory.

Thus, it would be desirable to provide a multi-function optical sensing system for determining information about ink droplets printed on media, and for determining information about the type of media, so the printing mechanism can adjust future printing for optimal images without requiring user intervention.

SUMMARY OF THE INVENTION

According to one aspect of the invention, a multi-function optical sensing system is provided for sensing ink droplets printed on media by an inkjet printing mechanism and for sensing indicia printed on media indicative of the media type. The multi-function optical sensing system has a first illuminating element positionable to illuminate selected portions of the media, and a second illuminating element positionable to illuminate selected portions of the media. A photodetecting element is directed to receive light reflected from the illuminated selected portions of the media, with the photodetecting element generating a signal in response to the light received. The multi-function optical sensing system has a first optical element which defines for the photodetecting element a first geometric pattern of light reflected from the media when illuminated by the first illuminating element. The sensing system also has a second optical element which defines for the photodetecting element a second geometric pattern of light reflected from the media when illuminated by the second illuminating element.

According to another aspect of the invention, a multi-function optical sensing system is provided for sensing ink droplets printed on media by an inkjet printing mechanism and for sensing indicia printed on media indicative of the media type. The multi-function optical sensing system has a first illuminating element positionable to illuminate selected portions of the media, and a second illuminating element positionable to illuminate selected portions of the media. A photodetecting element is directed to receive light reflected from the illuminated selected portions of the media, wherein the photodetecting element generates a signal in response to the light received. The multi-function optical sensing system also has a first optical element which defines for the photodetecting element a geometric pattern of light reflected from the media when illuminated by either the first illuminating element or the second illuminating element. The sensing system also has a second optical element which only allows light reflected from the media when illuminated by either the first illuminating element or the second illuminating element to reach the first optical element and the photodetecting element.

According to an additional aspect of the invention, an inkjet printing mechanism may be provided with such a multi-function optical sensing system for determining information about ink droplets printed on media by the printing mechanism, and for determining information about the media prior to printing.

According to still another aspect of the invention, a method of sensing ink droplets printed on media in an inkjet printing mechanism is provided. The method includes the step of delivering light of a first wavelength reflected from an illuminated first selected portion of the media in a first geometric pattern to a light sensitive member which generates a first signal in response to the light received. In another delivering step, light of a second wavelength reflected from an illuminated second selected portion of the media is delivered in a second geometric pattern to the light sensitive member which generates a second signal in response to the light received. The method includes the steps of optically regulating the first geometric pattern, and mechanically regulating the second geometric pattern.

According to a further aspect of the invention, a method of sensing ink droplets printed on media in an inkjet printing mechanism is provided. The method includes the steps of illuminating a first selected portion of the media that has no ink with a first wavelength of light, and monitoring the light reflected from said first selected portion and in response thereto, generating a bare media signal. The method also has steps for illuminating a second selected portion of the media that has ink with the first wavelength of light, and monitoring the light reflected from said second selected portion and in response thereto, generating an ink signal. The method has steps for illuminating a third selected portion of the media having indicia printed thereon indicative of the media type with a second wavelength of light, and monitoring the light reflected from the third selected portion and in response thereto, generating a media type signal. In one comparing step, the difference between the bare media signal and the ink signal is compared to a set of reference values, and in another comparing step the media type signal is compared to another set of reference values to determine the type of media. In an adjusting step, the printing of subsequent ink droplets on the media is adjusted in response to the comparing step.

An overall goal of present invention is to provide a multi-function optical sensing system for an inkjet printing mechanism, along with a method for optically determining the type of media and for determining a characteristic of an inkjet droplet printed on the media, so future droplets may be adjusted by the printing mechanism to produce high quality images on the particular type of media in use without user intervention.

A further goal of present invention is to provide an easy-to-use inkjet printing mechanism capable of compensating for media type and minor misalignments in ink droplet placement to produce optimal images for consumers.

An additional goal of the present invention is to provide a multi-function optical sensing system for an inkjet printing mechanism that is lightweight, compact and produced with minimal components to provide consumers with a more economical inkjet printing product.

BRIEF DESCRIPTION OF THE DRAWINGS

FIG. 3 is a perspective view of the interior of the monochromatic optical sensor of FIG. 2.

FIG. 4 is top plan view of one form of a lens assembly of the monochromatic optical sensor of FIG. 2.

FIG. 5 is bottom plan view of the lens assembly of FIG. 4.

FIG. 6 is side elevational view of the lens assembly of FIG. 4.

FIGS. 18A–18C are graphs of the spectral responses at the surfaces of the optical filter of FIG. 12, with:

FIG. 18A showing that of a first surface thereof;

FIG. 18B showing that of a second surface at a first zone thereof, and

FIG. 18C showing that of a second surface at a second zone thereof.

FIG. 19 is a schematic diagram illustrating the prior art monitoring system using the HP '002 optical sensor, discussed in the Background section above.

DETAILED DESCRIPTION OF A PREFERRED EMBODIMENT

Figure 1:
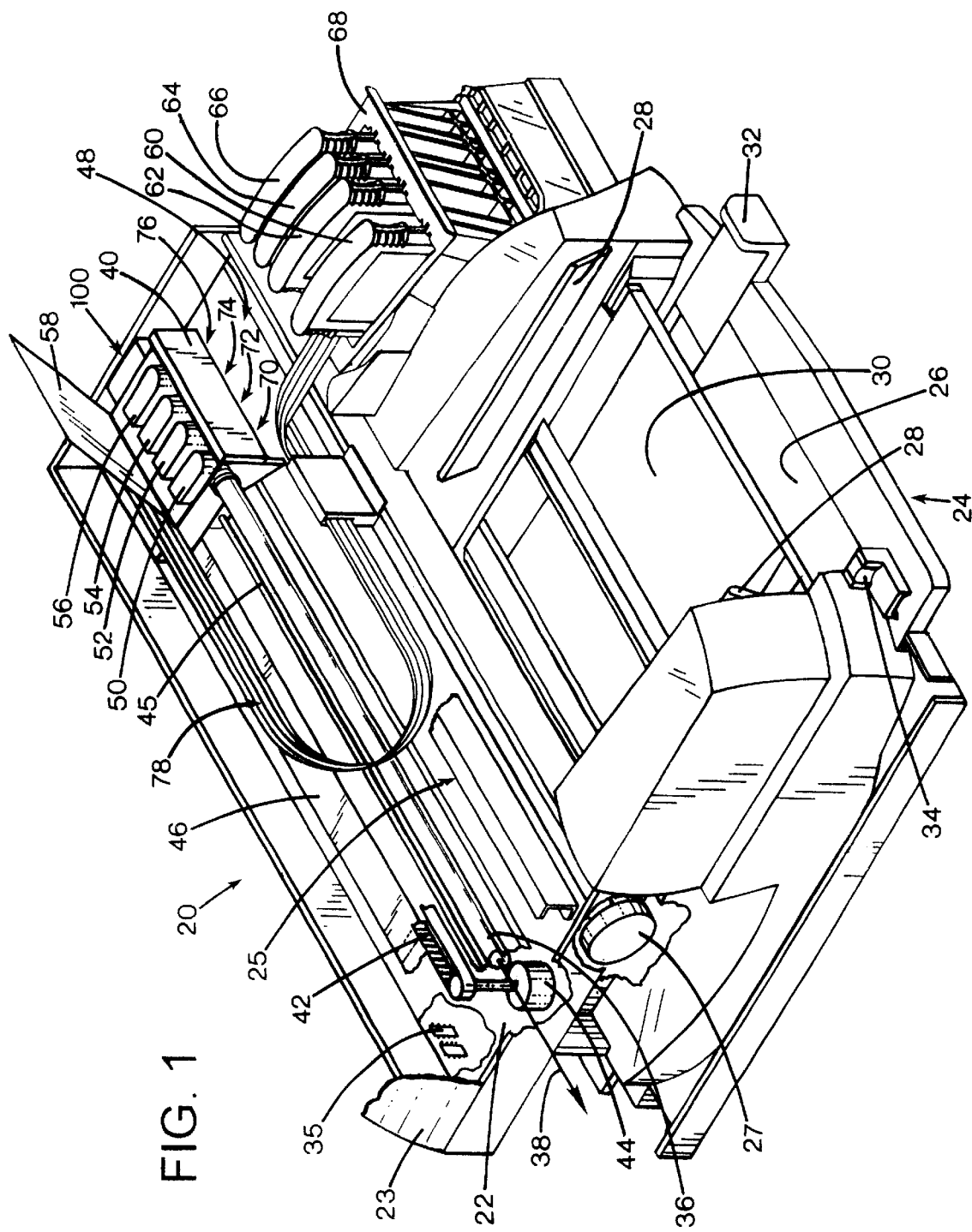
FIG. 1 is a fragmented perspective view of one form of an inkjet printing mechanism, here an inkjet printer, including one form of a monochromatic optical sensing system of the present invention.

FIG. 1 illustrates an embodiment of an inkjet printing mechanism, here shown as an inkjet printer 20, constructed in accordance with the present invention, which may be used for printing for business reports, correspondence, desktop publishing, artwork, and the like, in an industrial, office, home or other environment. A variety of inkjet printing mechanisms are commercially available. For instance, some of the printing mechanisms that may embody the present invention include plotters, portable printing units, copiers, cameras, video printers, and facsimile machines, to name a few. For convenience the concepts of the present invention are illustrated in the environment of an inkjet printer 20 which may find particular usefulness in the home environment.

While it is apparent that the printer components may vary from model to model, the typical inkjet printer 20 includes a chassis 22 surrounded by a housing or casing enclosure 23, the majority of which has been omitted for clarity in viewing the internal components. A print media handling system 24 feeds sheets of print media through a printzone 25. The print media may be any type of suitable sheet material, such as paper, card-stock, envelopes, fabric, transparencies, mylar, and the like, but for convenience, the illustrated embodiment is described using paper as the print medium. The print media handling system 24 has a media input, such as a supply or feed tray 26 into which a supply of media is loaded and stored before printing. A series of conventional media advance or drive rollers (not shown) powered by a motor and gear assembly 27 may be used to move the print media from the supply tray 26 into the printzone 25 for printing. After printing, the media sheet then lands on a pair of retractable output drying wing members 28, shown extended to receive the printed sheet. The wings 28 momentarily hold the newly printed sheet above any previously printed sheets still drying in an output tray portion 30 before retracting to the sides to drop the newly printed sheet into the output tray 30. The media handling system 24 may include a series of adjustment mechanisms for accommodating different sizes of print media, including letter, legal, A-4, envelopes, etc. To secure the generally rectangular media sheet in a lengthwise direction along the media length, the handling system 24 may include a sliding length adjustment lever 32, and a sliding width adjustment lever 34 to secure the media sheet in a width direction across the media width.

The printer 20 also has a printer controller, illustrated schematically as a microprocessor 35, that receives instructions from a host device, typically a computer, such as a personal computer (not shown). Indeed, many of the printer controller functions may be performed by the host computer, by the electronics on board the printer, or by interactions therebetween. As used herein, the term "printer controller 35" encompasses these functions, whether performed by the host computer, the printer, an intermediary device therebetween, or by a combined interaction of such elements. A monitor coupled to the computer host may be used to display visual information to an operator, such as the printer status or a particular program being run on the host computer. Personal computers, their input devices, such as a keyboard and/or a mouse device, and monitors are all well known to those skilled in the art.

The chassis 22 supports a guide rod 36 that defines a scan axis 38 and slideably supports an inkjet printhead carriage 40 for reciprocal movement along the scan axis 38, back and forth across the printzone 25. The carriage 40 is driven by a carriage propulsion system, here shown as including an endless belt 42 coupled to a carriage drive DC motor 44. The carriage propulsion system also has a position feedback system, such as a conventional optical encoder system, which communicates carriage position signals to the controller 35. An optical encoder reader may be mounted to carriage 40 to read an encoder strip 45 extending along the path of carriage travel. The carriage drive motor 44 then operates in response to control signals received from the printer controller 35. A conventional flexible, multi-conductor strip 46 may be used to deliver enabling or firing command control signals from the controller 35 to the printhead carriage 40 for printing, as described further below.

The carriage 40 is propelled along guide rod 36 into a servicing region 48, which may house a service station unit (not shown) that provides various conventional printhead servicing functions, as described in the Background section above. A variety of different mechanisms may be used to selectively bring printhead caps, wipers and primers (if used) into contact with the printheads, such as translating or rotary devices, which may be motor driven, or operated through engagement with the carriage 40. For instance, suitable translating or floating sled types of service station operating mechanisms are shown in U.S. Pat. Nos. 4,853, 717 and 5,155,497, both assigned to the present assignee, Hewlett-Packard Company. A rotary type of servicing mechanism is commercially available in the DeskJet® 850C, 855C, 820C, 870C and 895C models of color inkjet printers (also see U.S. Pat. No. 5,614,930, assigned to the Hewlett-Packard Company), while other types of translational servicing mechanisms are commercially available in the DeskJet® 690C, 693C, 720C and 722C models of color inkjet printers, all sold by the Hewlett-Packard Company.

In the print zone 25, the media receives ink from an inkjet cartridge, such as a black ink cartridge 50 and three monochrome color ink cartridges 52, 54 and 56, secured in the carriage 40 by a latching mechanism 58, shown open in FIG. 1. The cartridges 50–56 are also commonly called "pens" by those in the art. The inks dispensed by the pens 50–56 may be pigment-based inks, dye-based inks, or combinations thereof, as well as paraffin-based inks, hybrid or composite inks having both dye and pigment characteristics.

The illustrated pens 50–56 each include reservoirs for storing a supply of ink therein. The reservoirs for each pen 50–56 may contain the entire ink supply on board the printer for each color, which is typical of a replaceable cartridge, or they may store only a small supply of ink in what is known as an "off-axis" ink delivery system. The replaceable cartridge systems carry the entire ink supply as the pen reciprocates over the printzone 25 along the scanning axis 38. Hence, the replaceable cartridge system may be considered as an "on-axis" system, whereas systems which store the main ink supply at a stationary location remote from the printzone scanning axis are called "off-axis" systems. In an off-axis system, the main ink supply for each color is stored at a stationary location in the printer, such as four refillable or replaceable main reservoirs 60, 62, 64 and 66, which are received in a stationary ink supply receptacle 68 supported by the chassis 22. The pens 50, 52. 54 and 56 have printheads 70, 72, 74 and 76, respectively, which eject ink delivered via a conduit or tubing system 78 from the stationary reservoirs 60–66 to the on-board reservoirs adjacent the printheads 70–76.

The printheads 70–76 each have an orifice plate with a plurality of nozzles formed therethrough in a manner well known to those skilled in the art. The nozzles of each printhead 70–76 are typically formed in at least one, but typically two linear arrays along the orifice plate. Thus, the term "linear" as used herein may be interpreted as "nearly linear" or substantially linear, and may include nozzle arrangements slightly offset from one another, for example, in a zigzag arrangement. Each linear array is typically aligned in a longitudinal direction perpendicular to the scanning axis 38, with the length of each array determining the maximum image swath for a single pass of the printhead. The illustrated printheads 70–76 are thermal inkjet printheads, although other types of printheads may be used, such as piezoelectric printheads. The thermal printheads 70–76 typically include a plurality of resistors which are associated with the nozzles. Upon energizing a selected resistor, a bubble of gas is formed which ejects a droplet of ink from the nozzle and onto a sheet of paper in the printzone 25 under the nozzle. The printhead resistors are selectively energized in response to firing command control signals received via the multi-conductor strip 46 from the controller 35.

Monochromatic Optical Sensing System

Figure 2:
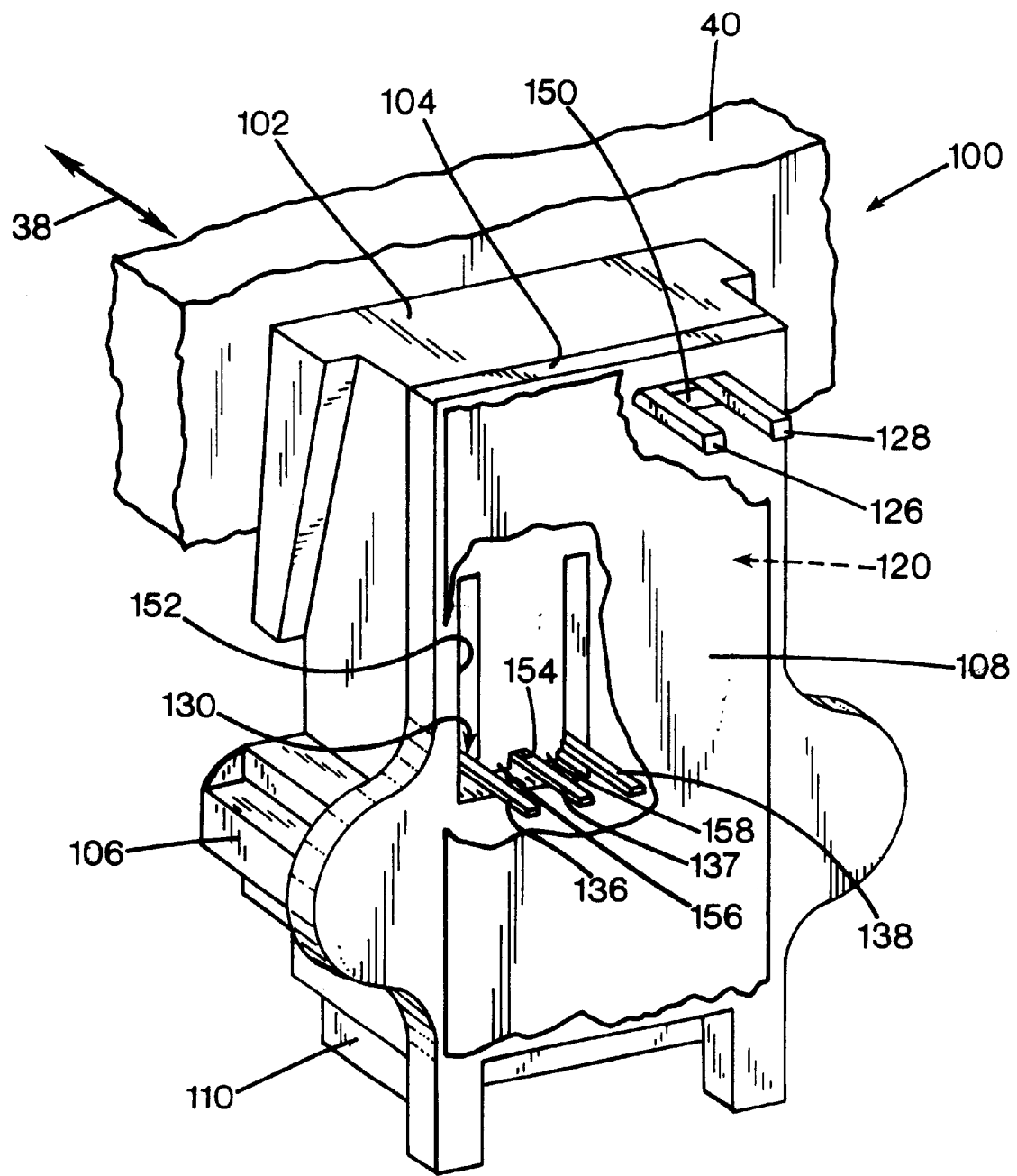
FIG. 2 is an enlarged, fragmented perspective view of a monochromatic optical sensor of the sensing system of FIG. I, shown mounted to a portion of the printhead carriage.

FIGS. 2 and 3 illustrate one form of a monochromatic optical sensor 100 constructed in accordance with the present invention. The sensor 100 includes a casing or base unit 102 which is supported by the printhead carriage 40, for instance using a screw attachment, slide and snap fittings, by bonding with an adhesive or constructed integrally therewith, or in a variety of other equivalent ways which are known to those skilled in the art. A cover 104 is attached to the case 102, for instance by a pair of snap fit fingers, such as finger 106 in FIG. 2. Preferably, the casing 102 and the cover 104 are both constructed of an injection molded rigid plastic, although it is apparent other materials may also be suitably employed. Overlying the cover 104 is a flex circuit assembly 108, which may be used to provide power to the sensor, and to deliver sensor signals back to the printer controller 35. The flex circuit 108 may couple the sensor 100 to an electronics portion (not shown) of the carriage 40, with the sensor signals then passing from the carriage 40 through the multi-conductor strip 46, which carries communication signals between the controller 35 and the carriage 40 to fire the printheads 70–76. A lens assembly 110 is gripped between lower portions of the casing 102 and the cover 104, with the lens assembly 100 being described in greater detail below with respect to FIGS. 4–6. Preferably, the rear portion, and/or the side portions of casing 102 define one or more slots (not shown) which receive the lens 110, with the cover 104 then securing the lens 110 within these slots. Alternatively, the lens assembly 110 may be bonded to the casing 102 or otherwise secured thereto in a variety of different ways known to those skilled in the art.

FIG. 3 shows the monochromatic sensor 100 with the cover 104 removed to expose the interior of the casing 102, and the internal components of the sensor. The casing 102 defines an LED (light emitting diode) receiving chamber 112 and an LED output aperture 114 which couples the interior of chamber 112 to a portion of the lens assembly 110. The casing 102 also defines two pair of alignment members 116, and an alignment cradle or trough defining member 118 which cooperate to receive a blue LED 120. A rear flange portion 122 of the blue LED 120 preferably rests against a lower side of each of the alignment members 116, with the trough portion of the support 118 being contoured to receive a front portion 124, adjacent an output lens 125, of the LED 120. Extending from the LED rear flange 122 are two input leads 126 and 128 which are electrically coupled to conductors in the flex circuit 108, for instance by soldering, crimping, or other electrical connection techniques known in the art. One suitable blue LED 120 may be obtained from Panasonic (Matsushita Electronics) of Kyoto, Japan, as part no. LNG992CF9, which is a T-1⅓ GaN LED.

The optical sensor 100 also includes a photodiode 130 that includes a light sensitive photocell 132 which is electrically coupled to an amplifier portion 134 of the photodiode 130. The photodiode 130 also includes input lens 135, which emits light to the light sensitive photocell 132. The photocell 132 is preferably encapsulated as a package fabricated to include the curved lens 135 which concentrates incoming light onto the photocell 132. The photodiode 130 also has three output leads 136, 137 and 138 which couple the output from amplifier 134 to electrical conductors on the flex circuit 108 to supply photodiode sensor signals to the controller 35, via electronics on the carriage 40 and the multi-conductor flex strip 46. Preferably, the photodiode 130 is received within a diode mounting chamber 140 defined by the casing 102. While a variety of different photodiodes may be used, one preferred photodiode is a light-to-voltage converter, which may be obtained as part no. TSL255, from Texas Instruments of Dallas, Tex.

Preferably, the casing 102 is formed with a spring tab 142 extending downwardly into chamber 140. The spring tab 142 contacts the external casing of the photodiode amplifier 134 to push the photodiode 130 against a pair of alignment walls 144, which define a passageway 145 therethrough. The passageway 145 couples the diode receiving chamber 140 with a focusing chamber 146. The lower portion of casing 102 defines a photodiode input aperture 148 therethrough which couples chamber 146 to a portion of the lens assembly 110. Thus, light from the lens assembly 110 passes on an inbound path through aperture 148, chamber 146, passageway 145, into the photodiode lens 135 to land on the photocell 132. Preferably, the casing 102 is constructed so that the LED chamber 112 is optically isolated from the photodiode chambers 140, 146 to prevent light emitted directly from the blue LED 120 from being perceived by the photocell 132. Thus, the outbound light path of the LED 120 is optically isolated from the inbound light path of the photodiode 130.

As shown in FIG. 2, to couple the LED leads 126, 128 and the photodiode leads 136–137 to the conductors of the flex circuit 108, the cover 104 preferably defines a slot 150 therethrough for the LED leads 128–126 and another slot 152 for the photodiode leads 136–138. To separate the photodiode leads 136, 137 and 138 from one another, preferably the cover 104 defines a recess 154 for receiving lead 137, with the recess being bounded by two notches, with one notch 156 separating leads 136 and 137, and another notch 158 separating leads 137 and 138. It is apparent that the LED lead slot 150 may also be configured with similar notches and recesses if desired to separate lead 126 from lead 128. The sizing and placement of the LED lead slot 150 and the photodiode lead slot 152, as well as their attachment to conductors of flex circuit 108, assist in accurately aligning both the LED 120 and the photodiode 130 for accurate relative alignment and orientation of the optical components, specifically, the LED output lens 125 and the photodiode input lens 135.

FIGS. 4–6 illustrate the construction of the lens assembly 10 which may be made of an optical plastic material molded with lens elements formed therein. FIG. 4 shows a diffractive lens element 160 formed along a top surface 162 of the lens 110. The diffractive lens 160 is located directly beneath the LED output aperture 114 which extends through the casing 102. FIG. 4 illustrates a bottom view of the lens assembly 110 which has a bottom surface 164 facing down toward the printed media. Opposite the diffractive lens 160, the lower surface 164 has a Fresnel lens element 165. FIG. 6 best shows a photodiode lens element 166 projecting outwardly from the lower surface 164. Preferably, the lens 166 is a convex aspheric condenser lens. FIG. 4 illustrates an upper or output lens element 168 of the photodiode lens, which is directly opposite the input portion 166. While the output element 168 may be a flat extension of the upper surface 162 of the lens 110, in some embodiments, contouring of the upper surface 168 may be desired to improve the optical input to the photodiode lens 135. Preferably, the photodiode output element 168 is also a diffractive lens, which may be constructed as described above for the upper diode lens element 160 to provide correction of chromatic aberrations of the primary input lens element 166.

Figure 7:
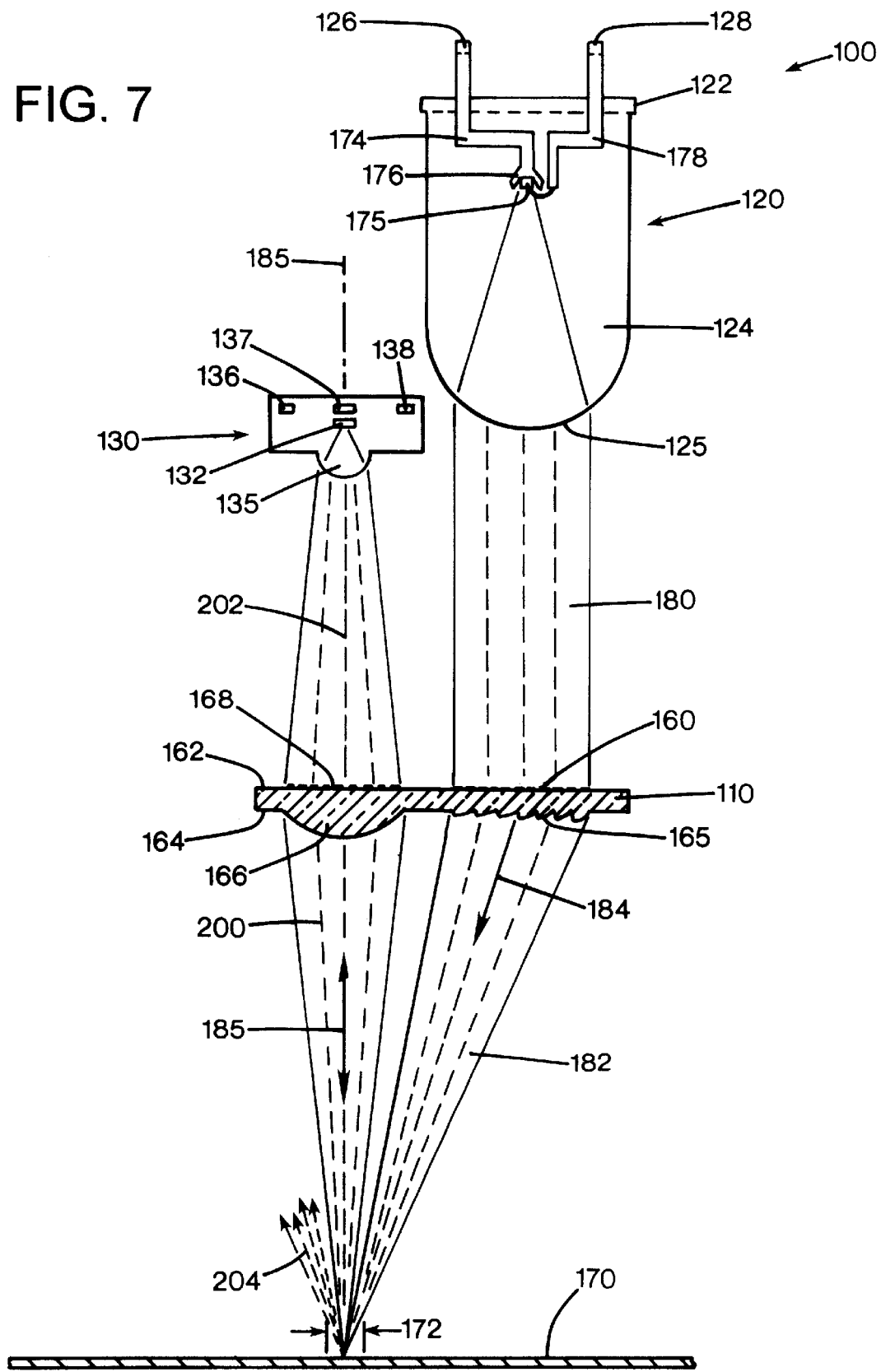
FIG. 7 is a schematic side elevational view illustrating the operation of the monochromatic optical sensor of FIG. 2.

FIG. 7 illustrates the operation of the blue LED 120 and the photodiode 130 when illuminating a sheet of media 170 at a selected region 172. The internal components of the blue LED 120 are also illustrated in FIG. 7. The LED 120 includes a negative lead frame 174 which is electrically coupled to the conductor 126. The LED 120 also has a die 175 mounted within a reflector cup 176, which is supported by the negative lead frame 174. The die 175 is used to produce the blue wavelength light emitted by the LED when energized. A positive lead frame 178 is electrically coupled to conductor 128, and serves to carry current therethrough when the blue LED 120 is turned on. Preferably, the negative lead frame 174, the die 175, cup 176, and the positive lead frame 178 are all encapsulated in a transparent epoxy resin body which is conformed to define the output lens 125 as an integral dome lens that directs light from the die 175 into rays which form an illuminating beam 180.

The LED portion of the lens assembly 110, including elements 160 and 165, serves to deflect, focus and diffuse the LED output beam 180, and to direct a resulting modified LED beam 182 toward the illuminated region 172 on media 170. To accomplish this action, the Fresnel lens 165 along the lower surface 164, is an off-axis element having an optical axis 184 that is coincident with a central axis 185 of the photodiode 130, with this coincidence between axes 184 and 185 occurring in the illuminated region 172. Additionally, the Fresnel lens 165 also has a focal length which is approximately equal to half the distance between the Fresnel lens 165 and the printing plane of the media 170. The diffractive lens element 160 diffuses the LED output beam 180, while the Fresnel element 165 redirects the diffused beam to arrive at the modified beam 182. Specifically, the Fresnel lens 165 laterally deflects the incoming beam 180 through a prismatic action, which permits the LED lamp 120 to be closely mounted to the photodiode 130 to provide a compact package for the monochromatic optical sensor 100. Furthermore, the prismatic function of the Fresnel lens 165 also partially focuses the modified beam 182 to a small selected region 172, while the defractive lens 160 diffuses the light beam 1 80 in a controllable fashion to provide the desired illumination at region 172.

The defractive lens 160 preferably has a multitude of closely spaced ridges that are each spaced apart to provide an interference effect so that a passing beam is effectively steered to a selected direction. By steering different portions of the incoming beam 180 by different amounts, this steering has a focusing effect for the modified beam 182. By introducing a slightly angular offset in random or selected regions of the defractive lens 160, a focused image may be slightly jumbled or scrambled without loss of efficiency to diffuse the output beam 182. The cooperation of the defractive lens 160 and the Fresnel 165 is shown in detail in FIG. 8.

Figure 8:
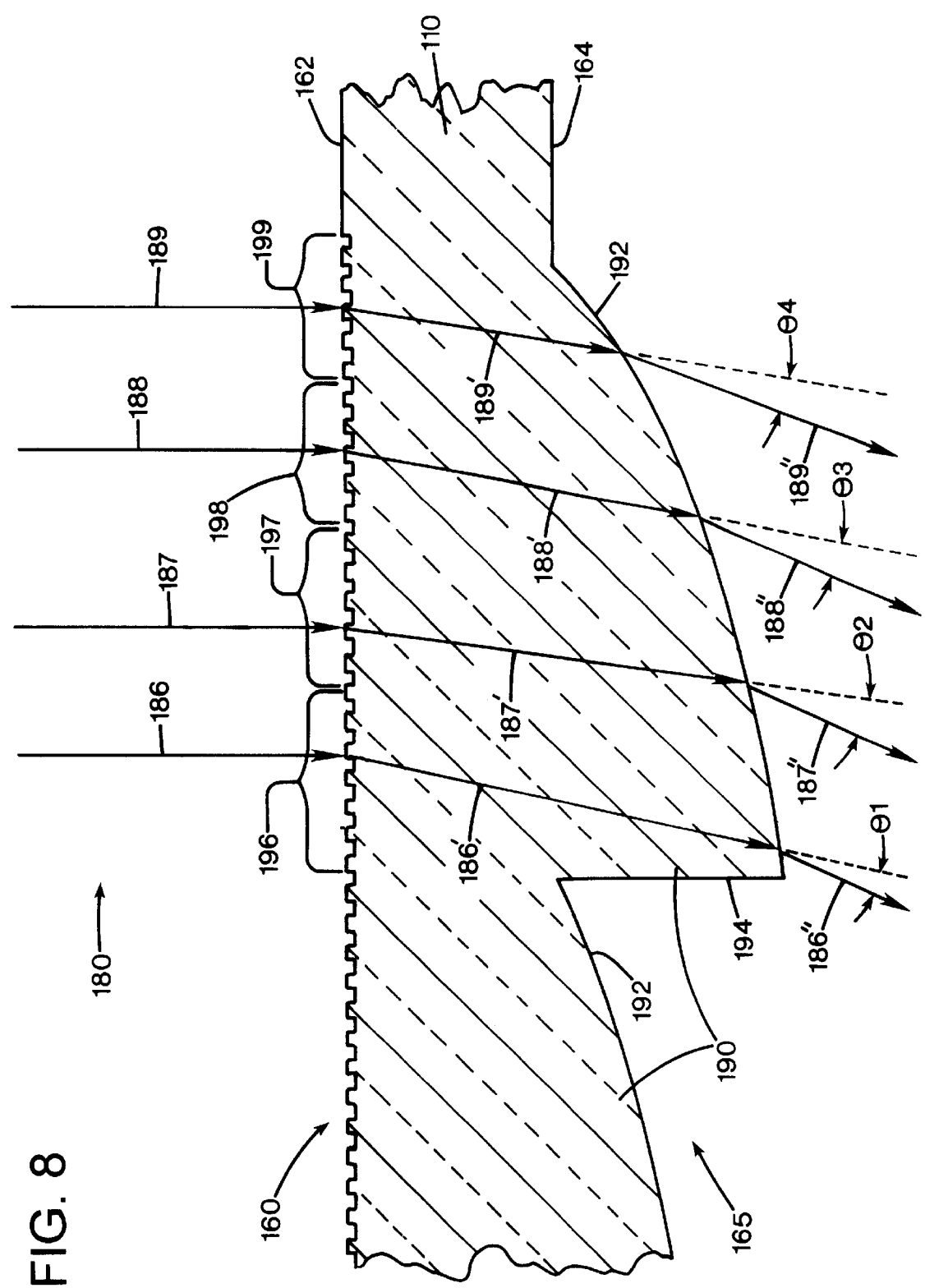
FIG. 8 is an enlarged, sectional view of a portion of the lens assembly of FIG. 4, illustrating the operation thereof.

FIG. 8 illustrates four incoming substantially parallel beams 186, 187, 188, and 189 of the LED output beam 180, which travel through the lens assembly 110 as beams 186', 187', 188', 189', then exit assembly 110 as beams 186", 187", 188", 189", respectively. The beam segments illustrated were selected to intercept one of plural crests 190 (see FIG. 5) upon exiting the Fresnel lens element 165. Each crest 190 has a downward arced surface 192 which terminates at a vertical wall 194, which is substantially parallel with the incoming beam segments 186–189.

The illustrated defractive lens 160 comprises a group of defractive cells 196, 197, 198 and 199, each shown redirecting one of the incoming beams 186–189 into beams 186'–189' which travel through the body of the lens 110. The curved arrangement of the cells 196–198 is shown in the top plan view of FIG. 4, with the curved aspect of these cells serving to begin directing the light beams toward the location of interest 172 on media 170 (FIG. 7), to the left in the view of FIG. 8. Besides this redirecting function, the diffractive lens element 160 also diffuses the beams to hide any irregularities in the lens element.

Preferably, each cell 196–199 comprises a group of finely ruled grooves that each have a slightly different pitch and orientation. By varying the pitch and orientation of the grooves, each cell 196–199 defracts the light rays 186–189 by a selected offset angle so the resulting rays 186"–189" exiting the lens are scrambled. This scrambling or diffusion of the rays is shown slightly exaggerated in FIG. 8, where the substantially parallel incoming beams 186–189 are no longer substantially mutually parallel as they travel through the lens as beams 186'–189'. While a simple offset using a controlled angle of about 0.5° in random directions may have an acceptable diffusing effect, preferably each cell 196–199 is carefully "programmed" that is, configured, to steer some of the rays 186'–189' more than others. This programmed diffusing effect tends to cancel out non-uniformities in the illumination pattern of the LED 120.

When passing through the Fresnel lens element 165, the arced portion 192 of each crest 190 serves to deflect the beams 186'–189' at different angles, depending upon which portion of the arc 192 the beams intersect. For example, the exiting beams 186"–189" have angles of deflection shown as $\theta 1$, $\theta 2$, $\theta 3$, $\theta 4$, respectively, with $\theta 1$ being the least deflection, and then widening through $\theta 2$ and $\theta 3$, to the greatest deflection, $\theta 4$. Thus, the crests 190 of the Fresnel lens 165, shown in the bottom plan view of FIG. 5, also serve to further condense and redirect the incoming LED beam 180 to the left in the view of FIGS. 7 and 8.

Returning to FIG. 7, the modified light beam 182 is shown impacting the region of interest 172, and thereafter it is reflected off the media 170 as a reflected light beam 200. The reflected light beam 200 then enters the convex lens 166 of the photodiode portion of lens 110. The illustrated convex aspheric condenser lens 166 is selected to focus essentially all of the reflected light 200 from region 172 into the photodetector 130, which is done in the illustrated embodiment with a focal length of approximately 5 mm (millimeters). It is apparent that in other implementations having different packaging and placements for sensor 100, that other focal lengths may be selected to achieve these goals. Preferably, the photodiode upper output lens 168 is molded with a defractive surface, which advantageously corrects any chromatic aberrations of the primary convex input lens 166. Thus, the reflected light wave 200 is modified by the convex and defractive portions 166, 168 of the photodiode portion of lens assembly 110, to provide a modified input beam 202 to photodiode lens 135, which then focuses this input beam 202 for reception by the photocell 132.

Preferably, the blue LED 120 emits light 180 at a peak wavelength of 430–500 nm (nanometers). In the illustrated embodiment, the casing 102 with cover 104 attached together form a monochromatic optical sensor module, which has external dimensions comprising a height of about 23 mm, a thickness about 10 mm, and a width of about 14 mm. In the illustrated embodiment, the lower surface of lens 110 is spaced apart from the upper print surface of the media 170 by about 10 mm, so the selected area of interest 172 is about 1 mm in diameter. While the entire area of the selected region 172 is viewed by the photodetector 130, the area illuminated by the LED 120 is slightly larger, usually about two millimeters in diameter, assuring that the entire portion of the selected region 172 is illuminated by the blue light from LED 120.

Figure 9:
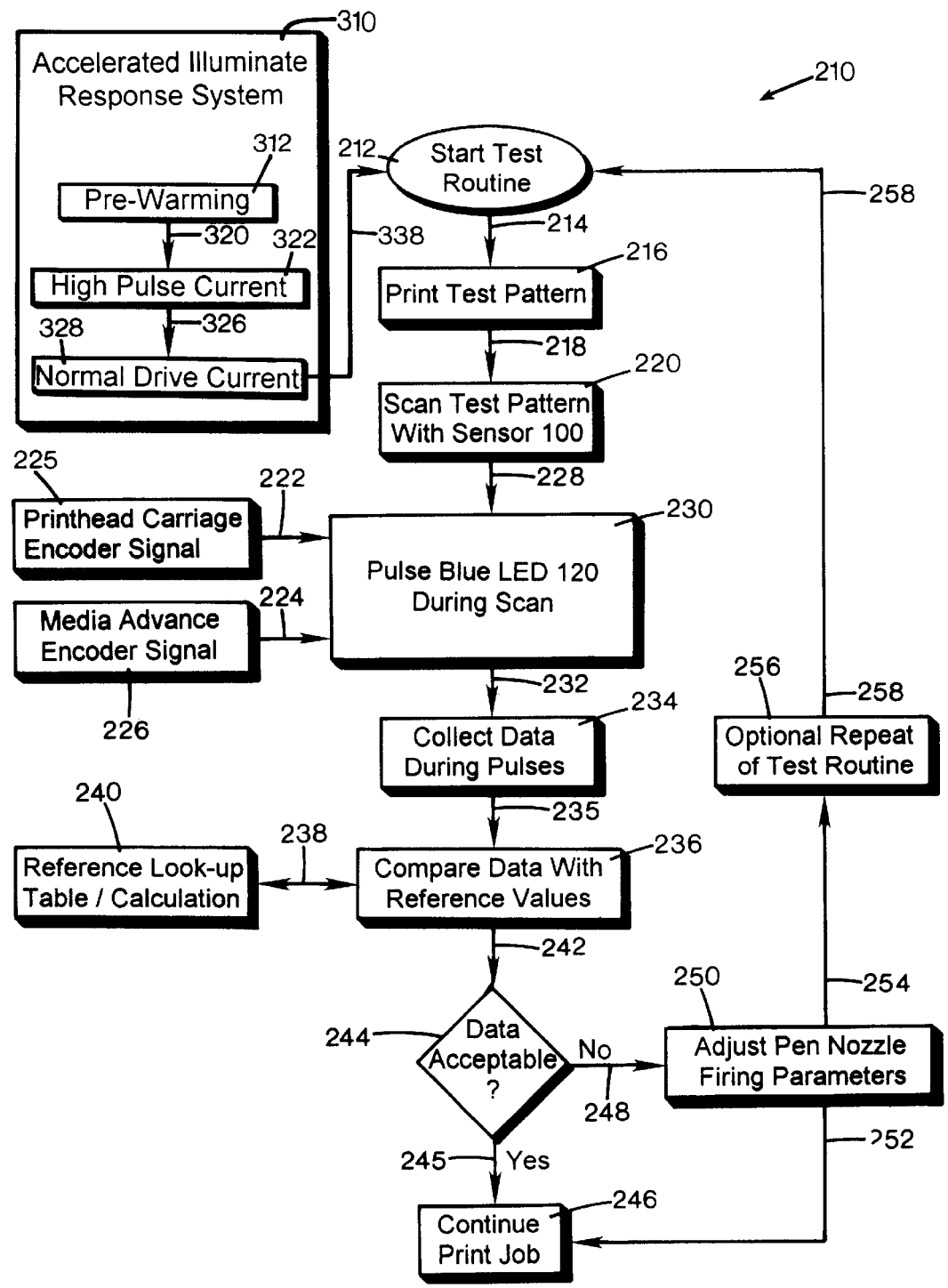
FIG. 9 is a flow chart of one manner of operating the monochromatic optical sensing system of FIG. 1.

In operation, FIG. 9 shows a flow chart illustrating one manner of operating a monochromatic optical sensing system 210 constructed in accordance with the present invention as including the monochromatic sensor 100 installed in printer 20. After an operator initiates a start test routine step 212, perhaps in response to prompting by the printer driver portion of controller 35, a start test signal 214 is sent to a print test pattern portion 216 of the system 210. The test pattern portion 216 then fires the nozzles to eject ink from one or more of the printheads 70–74 to print a test pattern on the media 170. For example, the printer controller 35 sends firing signals to the pens 50–56, causing the pens to print two patterns of parallel bars of each color, with one set of parallel bars being parallel with the scan access 38, and of the other group of parallel bars being perpendicular to the scan access 38. Upon completion of printing the test pattern, the test pattern portion 216 delivers a completion signal 218 to a scan test pattern with sensor portion 220 of system 210. After printing this test pattern, the carriage 40 again moves across the printzone 25, and the media sheet 170 is fed through the printzone by operation of the media advance motor 27 so the monochromatic sensor 100 passes over each pattern.

During this test pattern scan, the printer controller 35 uses inputs signals 222 and 224 from the printhead carriage position encoder 225 and the media advance encoder 226, respectively. To initiate the scan, the scan test pattern portion 220 sends a permission to pulse signal 228 to a pulse blue LED during scan portion 230 of the system 210. The encoder signals 222 and 224 are used to determine the timing of the LED pulses, as described below with respect to FIG. 10. It is apparent that other timing mechanisms may be used to pulse the LED 120, for instance, by pulsing on a temporal basis such as at a 1000 Hertz frequency during carriage or media movement, without using the carriage and/or media encoder signals 222 and 224. The pulses of portion 230 are used to generate a data acquisition signal 232 for a collect data during pulses portion 234 of system 210, which then transfers a scanned data signal 235 to compare data with reference values portion 236. In reviewing each pattern, the sensor 100 sends a variable voltage signal comprising signal 235 to the controller 35 to indicate the presence of ink printed within the field of view, such as region 172 in FIG. 7.

The printer controller 35 tracks locations of the test markings, and using portion 236 compares a desired location or parameter signal 238, stored in a reference look-up table or calculation portion 240, with the actual location or parameter monitored by the sensor 100, as represented by the data signal 235. Using the input sensor data of signal 235, the controller 35 calculates the actual position of each test pattern relative to the ideal desired position, and when required, the controller 35 enacts a compensating correction in the nozzle firing sequence for subsequent printing operations. The comparison portion 236 generates a resultant signal 242 which is delivered to a data acceptance portion 244. If the data is acceptable, then the acceptance portion 244 sends a Yes signal 245 to a continue print job portion 246 which allows printing to commence using the current nozzle firing parameters.

When a test mark on the media 172 is found at a location other than the desired location, or when a parameter is beyond desired limits, the acceptance portion 244 delivers a No signal 248 to an adjust pen nozzle firing parameters portion 250 of the printer controller 35, which then determines that a pen alignment or correction of the nozzle firing sequence is required. Following this correction by portion 250, a continue signal 252 may be sent to the continue print job portion 246. Optionally, following completion of the nozzle firing adjustment, portion 250 may send a repeat signal 254 to an optional repeat of test routine portion 256 of the monitoring system 210. Upon receiving signals 254, the repeat test portion 256 generates a new start signal 258 which is delivered to the start test routine portion 212 to reinitiate the monitoring system 210.

This scanning process involves activation of the blue LED 120 to emit the light beam 180, which is defracted or scrambled, i.e., diffused, by the defractive lens element 160, and then refracted and focused through the Fresnel lens 165. The diffraction occurs at different amounts so the majority of the modified rays 182 fall within the selected region of interest 172. Light impinging upon the selected region 172 has a specular reflection, illustrated as beam 204 in FIG. 7, that is reflected away from the optical axis of the aspheric element 166, due to the off-access position of the LED lens elements 160, 165 of assembly 110. The highly modulated diffuse reflection from the selected region 172 is captured by the photodiode lens 166, which, in cooperation with the optional defractive portion 168, concentrates the reflective beam 200 into an input beam 202 supplied to the photodiode 130. As mentioned above, the photodiode 130 includes an amplifier portion 134, which amplifies the output of the photocell 132 and then sends this amplified output signal via conductors 136–138 to the controller 35 for analysis.

Figure 10:
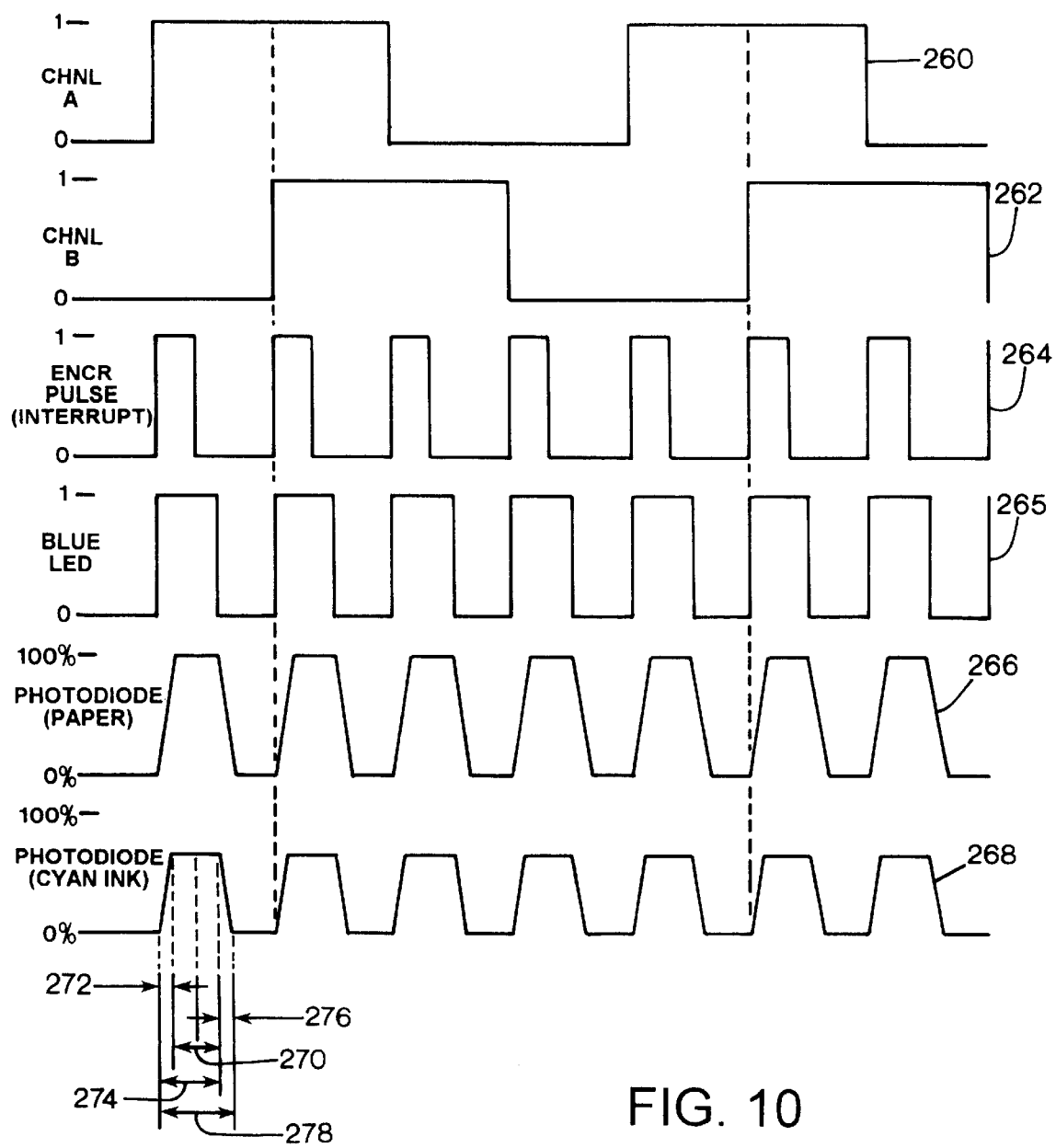
FIG. 10 is a signal timing diagram graphing the timing and relative amplitudes of several signals used in the monochromatic optical sensing system of FIG. 1.

As illustrated in FIG. 10, the controller 35 then accumulates each data point during a data window, which is preferably provided by energizing the blue LED 120 in a pulsed sequence. In FIG. 10, curves 260 and 262 show channel A ("CHNL A") and channel B ("CHNL B") as representing the transition of the positioning encoder on carriage 40, which may detect positional changes by monitoring the encoder strip 45 in a conventional manner. The channel A and B square waves 260, 262 then comprise the input signal 222 in the FIG. 9 flow chart. If the media advance is being scanned, then the channel A and B square waves 260, 262 represent the transition of the rotary position encoder for the media drive roller during media advancement through printzone 25 by operation of the media drive motor 27. Alternatively, this input may be supplied as a stepped output from motor 27, provided motor 27 is a stepper-type motor. Preferably, a rotary position encoder determines the angular rotation of the media drive component, with a rotary encoder reader providing the input shown as the channel A and B waves 260, 262, which together then comprise signal 224 in FIG. 9. When either the carriage or the media advance encoder changes state, these transitions, which are the vertical portions of curves 260 and 262, may be combined to generate an encoder pulse or interrupt signal, shown in FIG. 10 as curve 264. Each transition of curve 264 between zero and one may serve as an initiation signal for beginning a data acquisition sequence for the sensor 100.

The timing of the illumination of the blue LED 120 is shown in FIG. 10 as curve 265, with the numeral zero indicating an off-state of the LED, and numeral one indicating on-state. For convenience, curves 260–265 have been drawn to illustrate illumination with a 50% duty cycle on the LED 120, that is, the blue LED 120 is on for half of the time and off for the remaining half. It is apparent that other duty cycles may be employed, such as from 10–50% depending upon the scanning of carriage 40 and the advance of media sheet 170 through the printzone 25. Advantageously, pulsing the blue LED 120 with the illustrated 50% duty cycle obtains nearly twice the luminate intensity obtained using the HP '002 and '014 LEDs which were left on full time, as described in the Background section above.

In FIG. 10, curve 266 indicates the output of the photodiode 130 when the illuminated region 172 has no ink printed, so curve 266 indicates sensor 100 being focused on plain white paper. Thus, the maximum amplitude of signal 266 is shown as 100%, which provides a reflective luminosity reference for bare media to the controller 35 for the particular type of media 170 being used in the test process. For instance, brown paper would have less luminosity than white paper leading to a lower magnitude of light reaching the photodiode 130, yet, curve 266 still would be considered as a 100% no-ink reference by controller 35. Curve 268 illustrates the reflectance of cyan ink, when a cyan droplet appears in the illuminated region 172. Cyan ink has a reflectance of approximately 60% that of plain white paper, as illustrated by the lower magnitude of curve 268 when compared to the no-ink media curve 266.

The monitoring cycle during which controller 35 collects data is illustrated near the bottom of FIG. 10. Here, a data acquisition window 270 during which controller 35 monitors input from sensor 100 begins after a rise time 272. This rise time 272 begins at the initiation of a pulse of the LED 120, and ends after a known rise time of the photodiode 130, which may be obtained from the manufacturer specifications for the particular photodiode used. The LED 120 remains illuminated for a pulse 274 (at a value of "1") for the duration of the desired pulse width, as also illustrated by the curve 265, after which the LED is turned off (value of "0"). The time between the end of the rise time 272 and when the blue LED 120 is turned off, defines a data acquisition window 270. At the end of data acquisition window 270, the monitoring cycle is not yet complete because after turning off the LED 120, the photodiode 130 needs a stabilizing fall time 276. Thus, a total cycle time 278 of the sensor 100 starts at the beginning of the pulse to the LED 120, and then concludes at he end of the photodiode fall time 276, that is, the total cycle time equals the duration of the data acquisition window 270 plus the rise and fall times 272, 276 for response of the photodiode 130. Upon completion of this monitoring cycle 278, the sensor 100 remains dormant until the next encoder state change, as indicated by curve 264. During the data acquisition window 270, an A/D converter within the controller 35 is enabled and allowed to acquire the output signal of photodiode 130, as supplied via conductors 136–138.

The duty cycle of the blue LED 120, illustrated by curve 265 in FIG. 10, is dependent upon the desired forward current, that is the illumination level, and the speed at which the carriage 40 is scanned, or the speed at which the media 170 is advanced while the carriage is scanning across printzone 25. The speed of the media advance and the carriage dictates the allowable pulse width duration given the desired forward current. The relationship between the pulse width and the diode current is dependent upon thermal characteristics of the particular diode used, which are specified by the LED manufacturer. To maintain the spatial sampling and thermal control constraints of the blue LED 120, all scanning is preferably done at a constant specified velocity of the carriage 40 or the media drive motor 27, although it is apparent that other monitoring implementations may use variable or accelerating velocities while scanning.

Other print parameters may also be monitored by the monochromatic optical sensor 100 and adjusted by the controller 35 using method 210 illustrated in FIG. 9. For example, using the same sampling methodology, the monochromatic sensor 100 may also determine the color balance and be used to optimize the turn-on energy for each of the printheads 70–76. For example, to adjust color balance, regions of each primary ink may be printed, or a composite of overlapping droplets may be printed. A gray printed region, using all three color inks may also be suitable for such a color balance test pattern. By using the expected reflectance of the LED wavelength from the printed color as stored look-up table 240 of FIG. 9, and then comparing this expected reflectance with a measured reflectance in the comparison portion 236, the intensity of printing of a particular color may be determined and then adjusted by controller 35 to a desired level in step 250 of FIG. 9.

To measure the turn-on energy of the nozzles of printheads 70–76, swaths of printing test patterns may be made in step 216 of FIG. 10 using different amounts of energy applied to the firing resistors of each printhead 70–76. As the firing energy drops below a particular threshold, some of the printhead nozzles will cease to function, leaving no image on the media. By monitoring the energies at which drops were printed, and the locations at which the drops no longer appear on media 170, then in step 250, the controller 35 adjusts the turn-on energy for each nozzle by a limited amount above this threshold, so that only the minimal amount of energy required to print is applied to each resistor. By not overdriving the resistors with excessive power, resistor life is maximized without suffering any sacrifice in print quality.

Implementation of the monochromatic optical sensor 100 has recently become feasible for the more competitively priced home inkjet printer market. As mentioned in the Background section above, historically blue LEDs have been weak illuminators, and while brighter blue LEDs were available, they were prohibitively expensive for use in inkjet printers designed for home use. Recently, this pricing situation changed, and the bright blue LEDs have become available from several manufacturers. With this increased availability, competition in the market place has driven the price of these brighter blue LEDs down so quickly that at one point, a price decrease of 50% occurred over a two-month period of time. Thus, use of these brighter blue LEDs is now within the realm of consideration for the low volume, higher end products using the earlier HP '002 and '014 sensors. The advent of the monochromatic optical sensor 100, which eliminates the green LED of the HP '002 sensor, makes the use of optical sensors in home inkjet printers now feasible. Additionally, by employing the pulsed operation of the blue LED, as described above with respect to FIG. 10, this unique manner of driving the single blue LED 120 has further increased the light output of the sensor 100 by two to three times that possible using the earlier HP '002 and '014 sensors, where the LEDs always remained on during scanning.

Figure 11:
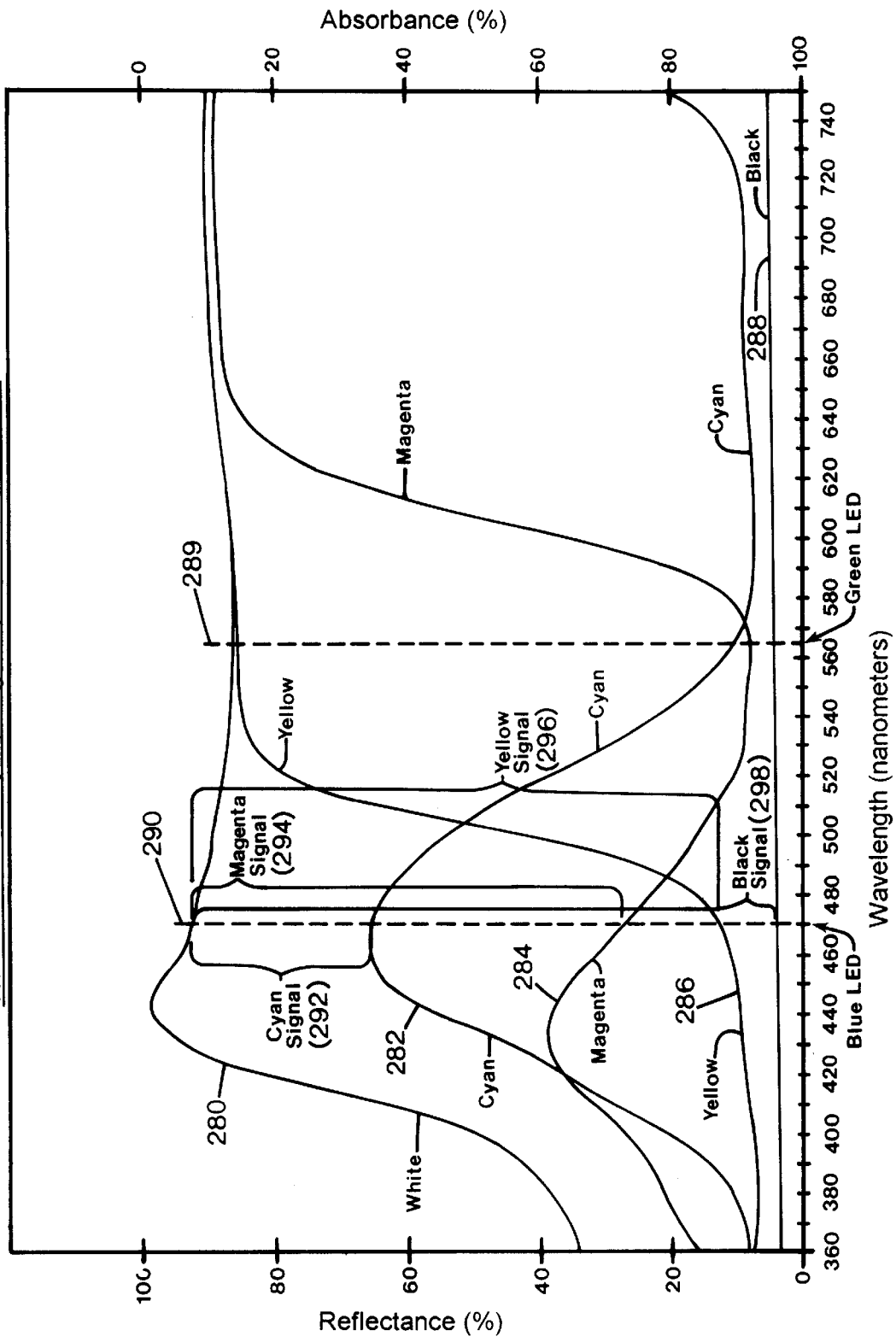
FIG. 11 is a graph showing the relative spectral reflectances and spectral absorbances versus illumination wavelength for white media, and cyan, yellow, magenta, and black inks, as well as the relative signal magnitudes delivered by the monochromatic optical sensing system of FIG. I when monitoring images printed on the media.

FIG. 11 is a graph of the spectral reflectance and absorbance by wavelength of the various primary colors of ink, black, cyan, magenta and yellow as well as that of white paper media 170. In FIG. 11, these reflectance and absorbance traces are shown as a white media curve 280, a cyan curve 282, a magenta curve 284, a yellow curve 286, and a black curve 288. In the past, the green LEDs emitted light at a wavelength of around 565 nm (nanometers), as illustrated at line 289 in FIG. 11. The blue LED 120 emits light at a peak wavelength of approximately 470 nm, as illustrated by a vertical line 290 in FIG. 11. By measuring at the illustrated 470 nm location, a separation between each of the ink traces 282–288 and media trace 280 is available. Indeed, monitoring anywhere between the 430 nm and 500 nm peak wavelengths provides quite suitable curve separations for ease of monitoring using the monochromatic sensor 100.

A few definitions may be helpful at this point, before discussing FIG. 11 in depth. "Radiance" is the measure of the power emitted by a light source of finite size expressed in $W/sr\text{-}cm^2$ (watts per steradian—centimeters squared). "Transmission" is measure of the power that passes through a lens in terms of the ratio of the radiance of the lens image to the radiance of the original object, expressed in percent. "Transmittance" is a spectrally weighted transmission, here, the ratio of the transmitted spectral reflectance going through the lens, e.g. beam 182, to the incident spectral reflectance, e.g. beam 180 (FIG. 7). "Reflected light" or "specular reflection" is that portion of the incident light that reflects off the media at an angle equal to the angle at which the light struck the media, the angle of incidence. "Reflectance" is the ratio of the specular reflection to the incident light, expressed in percent. "Absorbance" is the converse of reflectance, that is, the amount of light which is not reflected but instead absorbed by the object, expressed in percent as a ratio of the difference of the incident light minus the specular reflection, with respect to the incident light. "Diffuse reflection" is that portion of the incident light that is scattered off the surface of the media 170 at a more or less equal intensity with respect to the viewing angle, as opposed to the specular reflectance which has the greatest intensity only at the angle of reflectance. "Refraction" is the deflection of a propagating wave accomplished by modulating the speed of portions of the wave by passing them through different materials.

One important realization in developing the sensing system 210, using the monochromatic optical sensor 100, was that with a subtractive primary color system, cyan ink will never achieve the spectral reflectance of the paper upon which it is printed. Printing with the colors of cyan, yellow and magenta is considered to be a "subtractive" primary color system, as opposed to the combination of red, green, and blue which is considered to be an "additive" system, such as used to produce color images on television and computer screens. As seen in FIG. 11, the yellow curve 286 approaches the reflectance of the media curve 280 just to the right of line 289, whereas the magenta curve 284 approaches the media curve 280 around the 650 nm wavelength intersection point. The cyan curve 282 peaks at around 460 nm at a level of about 60% reflectance, which is far less than the reflectance of the media curve 280 at that point. Cyan ink will not reach the spectral reflectance of the media 170 for two reasons.

First, most paper is coated with ultraviolet fluorescing compounds which make the paper appear whiter by absorbing ultraviolet (uV) ambient light and then fluorescing this light back off the paper at slightly longer blue wavelengths. Since paper does not fluoresce from exposure to the blue spectrum of ambient or room light, the apparent reflectance of the ink, even if cyan ink had perfect transmittance, would never reach 100%. This difference, due to the fluorescing nature of the paper media 170, comprises a detection signal used by the controller 35, as discussed further below.

Second, the peak transmittance of cyan dyes is typically lower than ink with yellow or magenta dyes, and this transmittance never exceeds 80%, as seen from the curve 282 in FIG. 11. The currently available dye compounds which readily absorb longer wavelength light, down to the green range of this desired spectrum, tend to continue to absorb light even within this blue transmissive range. Thus, adjusting the dye compounds in an effort to increase blue transmittance results in a corresponding decrease in the long wavelength absorption, for instance, as indicated at the 560–750 nm portion of the cyan curve 282 in the FIG. 11 graph. Therefore, inherent to the dye chemistry, a difference between the bare media reflectance and the cyan ink reflectance always exists. This difference in reflectance is what is exploited by the monochromatic optical sensor 100.

In the past, use of the green LED emitting light at a 565 nm wavelength allowed detection of cyan and magenta at their minimal reflectance (left scale of FIG. 11, which is also their maximum absorbance, as indicated by the scale to the right of FIG. 11.) Unfortunately, detection of yellow at the 565 nm wavelength proved to be a problem because the yellow reflectance approximated that of the white paper at this green LED wavelength. This problem was addressed by printing magenta ink over a previously printed yellow test band, with differing results depending upon the type of media being used, as discussed in the Background section above.

This yellow ink detection problem is avoided by monitoring the media and ink droplets when illuminated at the 470 nm peak wavelength of the blue LED 120, because the signals used by the controller 35 are the absorbance of these inks relative to the absorbance of the media 170. Indeed, yellow ink may be easily detected between the 430 nm and the 500 nm peak wavelengths. As seen in FIG. 11, at the 470 nm wavelength of the blue LED 120, the ink curves 282–288 are each separated in magnitude from one another. While the illustrated blue LED emits a 470 nm wavelength, this value is discussed by way of illustration only, and it is apparent that other wavelengths of monochromatic illumination may also be used to exploit any other points on the graph where there is adequate separation of the ink curves 282–288 to allow detection and differentiation between the colors, including ultraviolet or infrared wavelengths. In the illustrated embodiment, the absorbance of the cyan ink produces a cyan signal 292, which is the difference between the absorbance of the cyan ink and the media when illuminated at a 470 nm wavelength. Similarly, a magenta signal 292, a yellow signal 296, and a black signal 298 are each produced as the difference between the absorbance of each of these inks and the absorbance of media 170 when illuminated at 470 nanometers by the blue LED 120. Thus, the cyan signal 292 is a difference of approximately 30%, the magenta signal 294 is approximately 70%, the yellow signal 296 is approximately 80%, and the black ink signal is approximately 90%.

As another advantage, there is a mutual relationship between the intensity of the illumination at location 172 (FIG. 7) and the source of noise in the resulting signals sent to the controller 35. With all other factors being equal, the noise produced by the photodiode 130 is a function only of the pulsing frequency of the blue LED, which then increases by the square root of the signal frequency. Increased intensity, however, does not increase the noise. Thus, pulsing of the LED 120 is an efficient way to increase the intensity of beam 180 and the signal-to-noise ratio. While the noise will increase with increases in the pulsing frequency, the level of the signal increases at an even greater rate. At moderate pulsing frequencies, such as those around one to four Kilo-Hertz, the benefits of the larger signal greatly outweigh the disadvantages of the increased noise. Thus, this pulsed driving scheme for illuminating the media with LED 120, and the data sampling routine illustrated above with respect to FIGS. 9 and 10, efficiently and economically allows monitoring of drop placement on the media in an automatic fashion by the printer 20 without user intervention.

Advantageously, elimination of the green LED(s) required in earlier HP '002 and '014 sensors (see FIG. 19) reduces the direct material cost of the sensor by 46–65 cents per unit for the monochromatic optical sensor 100. Moreover, by eliminating the green LED, the sensor package is advantageously reduced in size by approximately 30% compared to the HP '002 sensor. The reduced size and weight of the monochromatic sensor 100 advantageously lightens the load carried by carriage 40 during scanning and printing. Furthermore, elimination of the green LED used in the earlier HP '002 and '014 sensors requires less cable routing between the controller 35 and the sensor 100. Additionally, by pulsing the blue LED 120 rather than leaving it on for the full scanning pass, advantageously provides a greater input signal level to the photodiode 130, which then allows simpler signal processing at a greater design margin than was possible with the earlier HP '002 and '014 sensors. Finally, assembly of the monochromatic optical sensor 100 is simpler than the earlier LIP '002 and '014 sensors because fewer parts are required, and elimination of the green LED also eliminates the possibility of mis-assembly, where the blue and green LEDs could inadvertently be mounted in the wrong locations within the sensor packaging.

With the increased intensity provided by pulsing the blue LED, an intensity of up to approximately 3600 mcd is obtained using the blue LED 120, as compared to an intensity of 15 mcd produced by the earlier blue LEDs used in the HP '002 sensor. With this increased intensity of the monochromatic sensor 100, none of the signal enhancing techniques used in the earlier HP '002 and '014 sensors, such as a 100× amplifier, AC coupling of the output signal, and a ten-bit A/D converter, are all eliminated with monochromatic sensor 100. Indeed, the sensor 100 may be coupled directly to an A/D converter, which preferably occupies a portion of the application specific integrated circuit (ASIC) provided within the printer controller 35. Furthermore, by implementing a multiplexing signal transfer strategy between the sensor 100 and the controller 35, the cost of the A/D converter and the ASIC is further reduced.

Use of the defractive lens technology in constructing element 160, and optionally in element 168 of the lens assembly 110, advantageously decreases the overall size of the optical package of sensor 100. Further reductions in package size of the casing 102 and cover 104 are gained by eliminating the green LED, so the monochromatic sensor 100 is roughly 30% of the size of the HP '002 sensor (see FIG. 19), and approximately 70% the size of the of the HP '014 sensor, both described in the Background section above.

Furthermore, use of the monochromatic optical sensor 100 avoids the use of ink mixing to determine the location of some inks, as was practiced using the HP '014 sensor described in the Background section above. Now sensing of dot placement is no longer dependent upon the type of media used, because the monochromatic sensor 100 accurately registers the location of a droplet, whether placed on a high-gloss photographic quality paper, or a brown lunch sack, or any type of media in between. This is possible because the monochromatic sensor 100 detects the fundamental spectral properties of each of the primary colors, black, cyan, magenta and yellow.

Additionally, by pulsing LED 100 during the duty cycle, the blue LED may be driven at a higher current level during the LED on-time 274 in FIG. 10, and then allowed to cool during the remainder of the time between pulses of curve 266. Thus, the average current over time for the entire period is the same as the DC value, but the peak current during the on-segment 274 leads to a higher peak illumination when LED 120 is pulsed. Thus, pulsed operation of the blue LED 120 obtains greater illumination using a more economical LED, resulting in an energy savings as well as a material cost savings without sacrificing print quality, all of which benefit consumers.

Multi-Function Optical Sensing System

Figure 12:
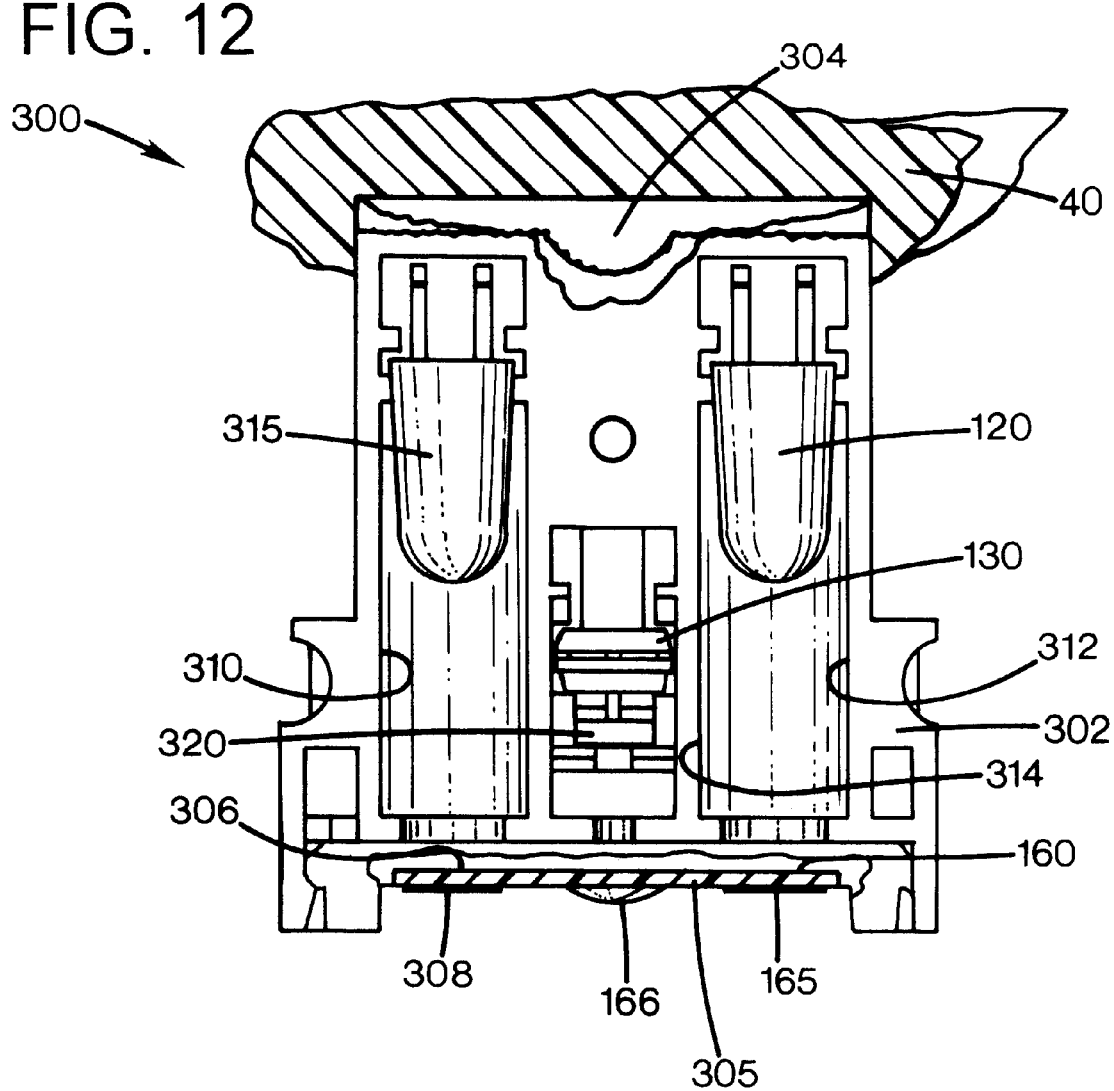
FIG. 12 is an enlarged, fragmented front perspective view of the interior of a multi-function optical sensor, including an optical filter portion, which may be implemented in the inkjet printing mechanism of FIG. 1, shown mounted to a portion of the printhead carriage.

FIG. 12 illustrates one form of a multi-function optical sensor 300 constructed in accordance with the present invention, which includes a casing or base unit 302 supported by the printhead carriage 40, for instance as described above for base 102. A cover 304 may be attached to base 302, with a flex circuit assembly (not shown) overlying the cover 304, as described above for flex circuit 108, to provide power to the sensor, and to deliver sensor signals back to the printer controller 35. A lens assembly 305 is gripped between lower portions of the base 302 and the cover 304, with the lens assembly 305 being mounted to the casing in a manner similar to that described above for lens 110. The lens 305 may be constructed in a manner similar to that described above for lens 110, including the diffractive lens portion 160 located at one end, the photodiode lens element 166 located centrally, and a second diffractive lens portion 306 located at the other end of the lens 305. 1The second diffractive lens portion 306 is constructed in a manner similar to that described above for lens 160. The lens assembly 305 includes a second Fresnel lens element 308, which is essentially a mirror image of lens element 165, constructed to direct outgoing light pulses emitted from sensor 300 toward the media for reflection back into the photodiode lens element 166.

The multi-function sensor base 302 defines two LED (light emitting diode) receiving chambers 310 and 312, which may be constructed as described above for chamber 112. The sensor base 302 also defines a photodiode mounting chamber 314, similar in construction to chamber 140. A red LED 315 is housed in chamber 310 for use in media type detection, while a blue LED 120 is mounted in chamber 312 for printed drop or "spot" detection, as described above for the monochromatic optical sensor 100. A photodiode 130, as described above, is mounted within chamber 314. One suitable red LED 315 may be obtained from the Hewlett-Packard Company of Palo Alto, Calif., as part no. QMLP-C165, which is a transparent substrate AlGaAs LED. While the red LED 315 is shown on the left and the blue LED 120 on the right in FIG. 12, the sensor 300 may also be constructed with the blue LED 120 in chamber 312 and the red LED 315 in chamber 310.

For media type detection, the various different types of print media, such as transparencies, photographic paper, labels, etc., may be marked prior to sale with an invisible fluorescent ink to have indicia, such as a bar code or other marking to indicate the media type. The printer controller 35 has a look-up table that interprets the code read to determine the type of media and in response thereto, to adjust the printing routine to produce an optimal image. For instance, in the media detect operation, the multi-function sensor 300 is scanned over a preprinted pattern of invisible ink bars encoded on the media 170'. After scanning, this spatially sampled data is grouped together based on the relative position on the bars. The level of signal within each grouping determines the presence or absence of a bar at a particular position. The pattern is thus decoded into binary data. From the binary decoding the pertinent attributes are communicated to the printer controller 35, and these attributes are then used to configure the printer 35 for optimum printing on the scanned media.

With reference to the flow chart of FIG. 9, the media detect function may be mapped over the spot detection routine illustrated. For instance, a start media type detection routine may be substituted for step 212, step 216 omitted, and a read preprinted code step substituted for step 220. The two steps 225 and 226 may be used to position the carriage for this scanning step, with step 230 modified to pulse the red LED 315. Steps 234 and 236 remain, with the table of step 240 holding media code and type data. Once the type of media is determined, step 250 may be conducted to produce an image which is optimal for the type of media being used, with the print job then continuing through step 246. Two steps 244 and 256 may be omitted during the media detection routine.

Figure 13:
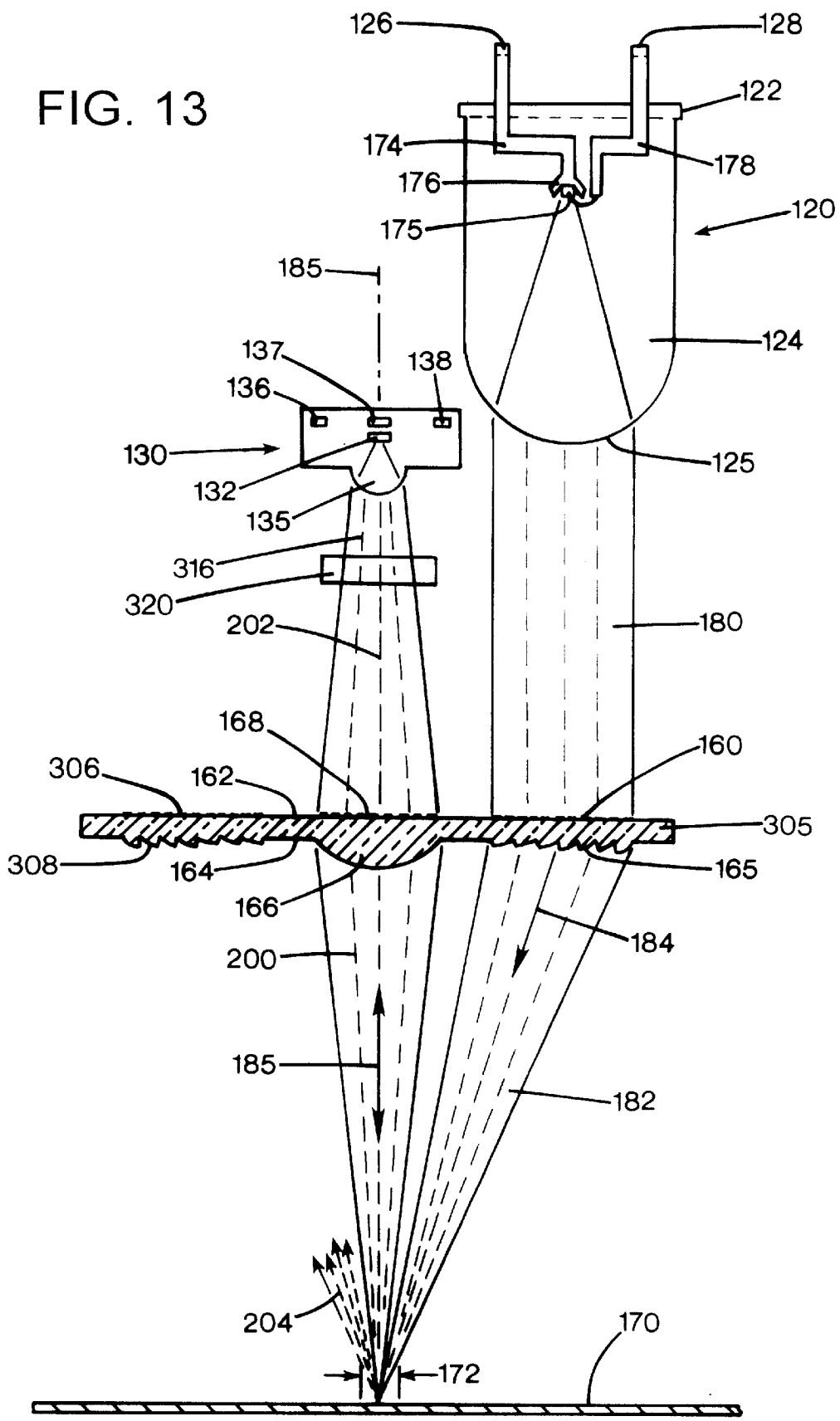
FIG. 13 is a schematic front elevational view illustrating the operation of the blue LED spot detection portion of the multi-function optical sensor of FIG. 12.
Figure 14:
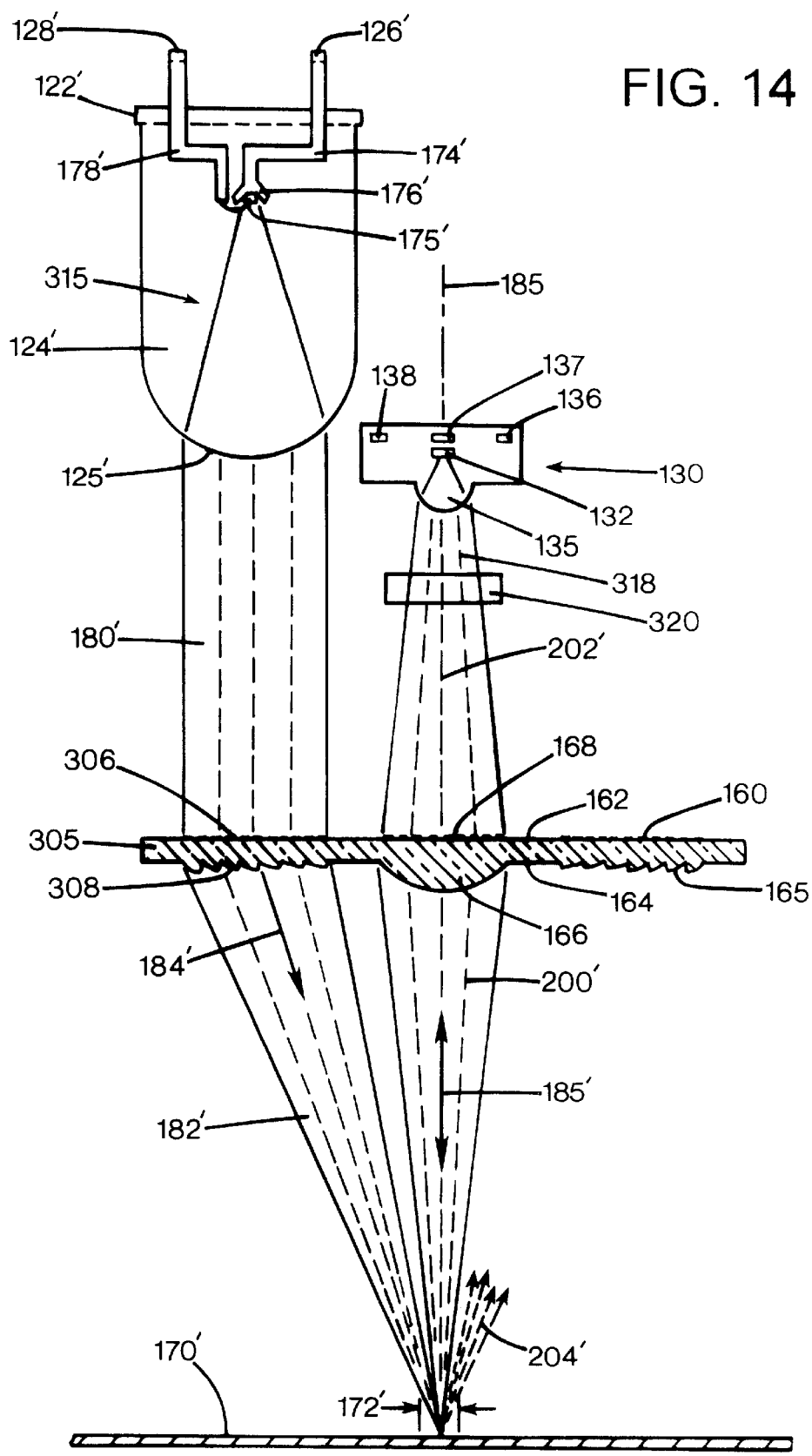
FIG. 14 is a schematic front elevational view illustrating the operation of the red LED media type detection portion of the multi-function optical sensor of FIG. 12.

FIG. 13 shows the operation of the blue LED 120. FIG. 14 shows the operation of the red LED 315, which is essentially the same with respect to components and light path of the blue LED 120, so similar items are designated with the "prime" symbol in FIG. 14. For instance, the red LED 315 has a rear flange portion 122', which is similar in construction to the rear flange portion 122 of the blue LED 120. However, the red LED die 175' is selected to emit red light. One major difference between the views of FIGS. 13 and 14 from that of FIG. 7 is the light which is actually received by the photodiode 130, with the light impinging on photodiode 130 emitted from the blue LED 120 being labeled as item number 316, and the from the red LED 315 being labeled as item number 318. The multi-function sensor 300 includes a unique wavelength dependent, optical field stop and filter assembly or unit 320, constructed in accordance with the present invention, which alters the incoming reflected blue light 202 from the incoming reflected red light 202' to produce exiting light beams 316 and 318, respectively.

One of the main roadblocks to creating a multi-function sensor was the difference in the fields of view for the media type detection of the red LED and for the spot detection of the blue LED. For media type detection, a rectangular field of view, preferably 1 mm×2 mm in size, on the surface of the media is required, while for spot detection, a circular field of view, preferably approximately 1–1.5 mm in diameter, is needed. Changing the viewing area size, as well as the shape was the challenge faced by the inventor. Changes in field of view size and shape may be accomplished by changing a field stop. A classic fixed field stop is a mechanical feature usually constructed as a portion of the housing which supports various optical elements of a lens system.

In the past, changes in field stops have been preformed in still-image cameras and in video cameras using expensive motorized mechanisms to physically move the different stops into and out of the optical path. Unfortunately, motorized mechanisms are unsuitable for use in an economical inkjet printing unit, because, not only would they add cost, but they would also increase the size and weight of a carriage-mounted sensor system beyond any practical use. The impracticality and expense of a motorized field stop made the use of separate media type and spot detect sensors the best viable alternative in the past, and this roadblock was where conventional thinking on the subject of a multi-function sensor always stopped.

Thus, the challenge faced by the inventor to develop a multi-function sensor was not only to change the size and shape of the field of view, but also to do this at minimal cost without adding excessive weight and bulk to the carriage-mounted sensor. The operating wavelength of the image illuminated by the red LED 315 may be selected to be different than the operating wavelength of the blue LED 120, and this separation in these operating wavelengths was capitalized upon to develop the multi-function sensor 300.

Figure 15:
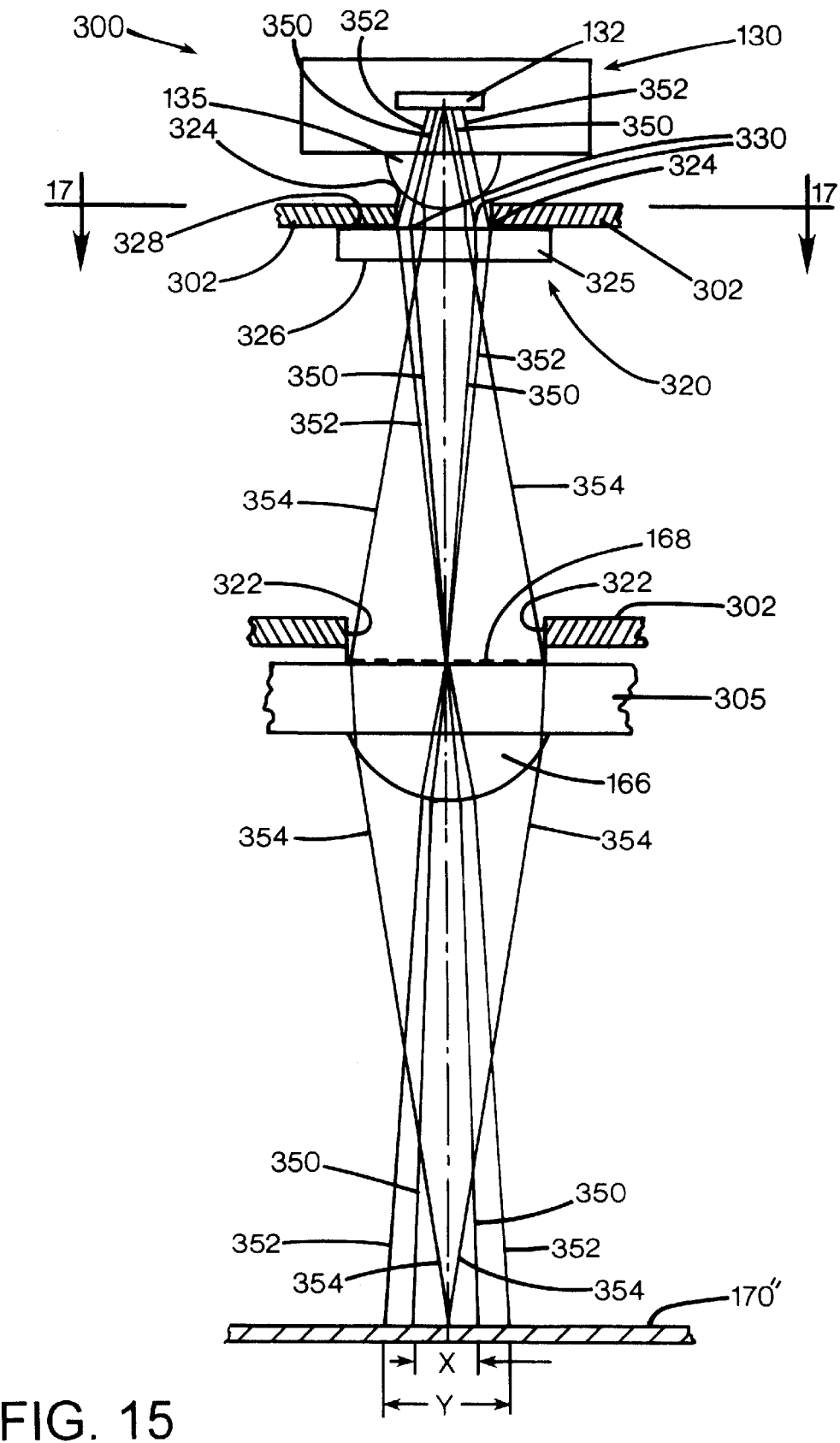
FIG. 15 is a schematic side elevational view illustrating the operation of the optical filter of FIG. 12.

FIG. 15 illustrates the construction and operation of the filter unit 320. The photodiode output lens element 168 is mounted adjacent to an aperture stop 322 defined by a circular opening in the sensor base 302. The base 302 also defines a rectangular opening comprising a mechanical field stop 324 adjacent to the photodiode input lens 135, with a preferred dimension for the field stop 324 being about 0.54 mm×1.08 mm for the illustrated embodiment. Mounted underneath the field stop 324 is an optical filter element 325, which has a lower first or incoming surface 326 facing lens 305, and an upper second or exiting surface 328 facing the photodiode 130.

Figure 16:
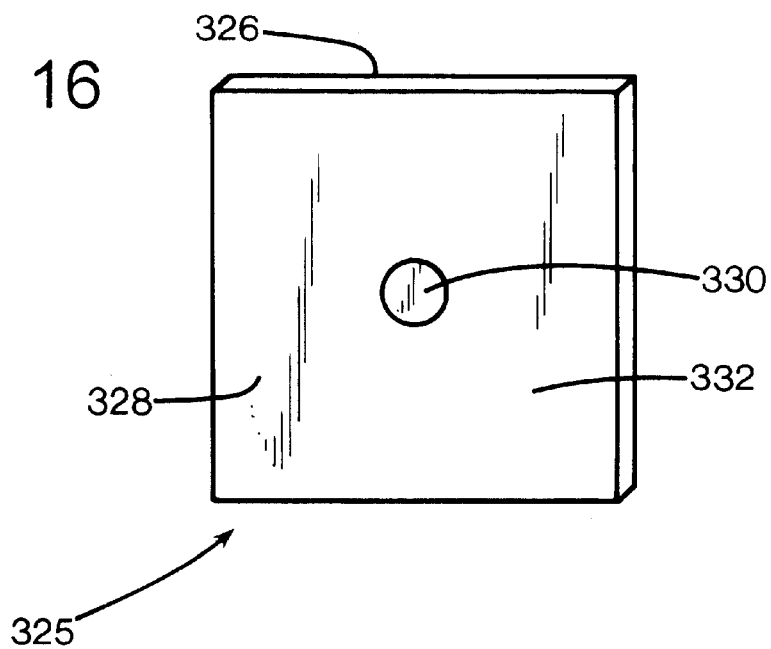
FIG. 16 is a perspective view of the upper exiting surface of the optical filter of FIG. 12.
Figure 17:
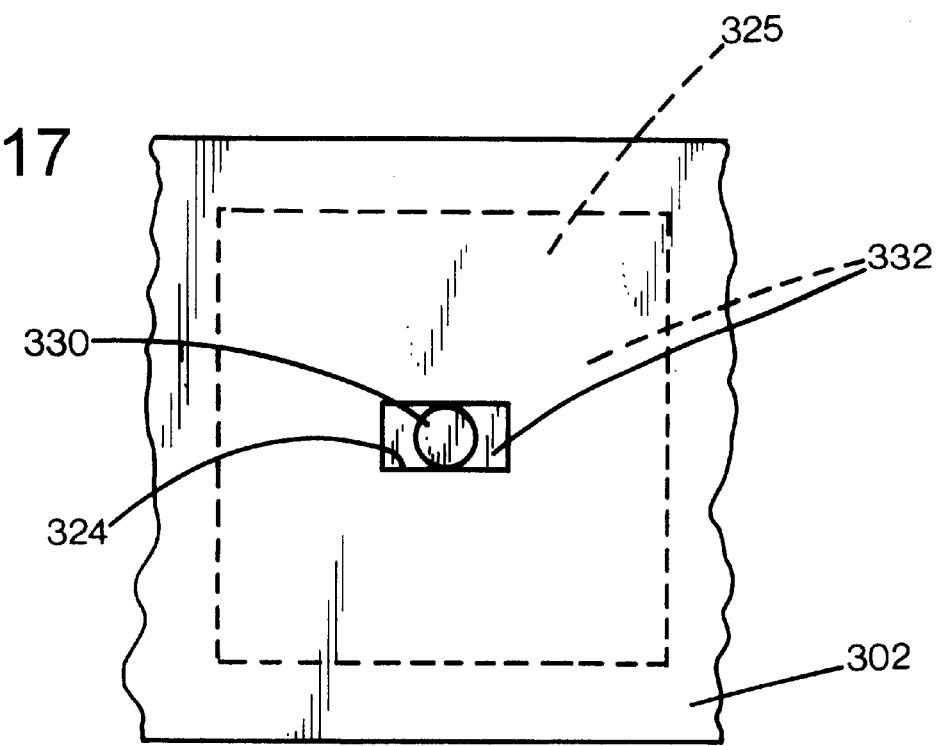
FIG. 17 is a top plan view of a portion of the optical filter of FIG. 15 taken along lines 17—17 thereof.

FIG. 16 shows one preferred construction for the filter element 325 as having a central circular zone 330 on the exiting surface 328, surrounded by a remaining outer zone 332 which has a different spectral response than the circular zone 330. FIG. 17 shows the relative alignment of the filter element 325 with respect to the mechanical field stop 324 when the sensor 300 is assembled. Preferably the filter circular zone 330 is located centrally within the rectangular mechanical field stop 324 to control the light spectrum received by the photodiode 130.

Figure 18A:
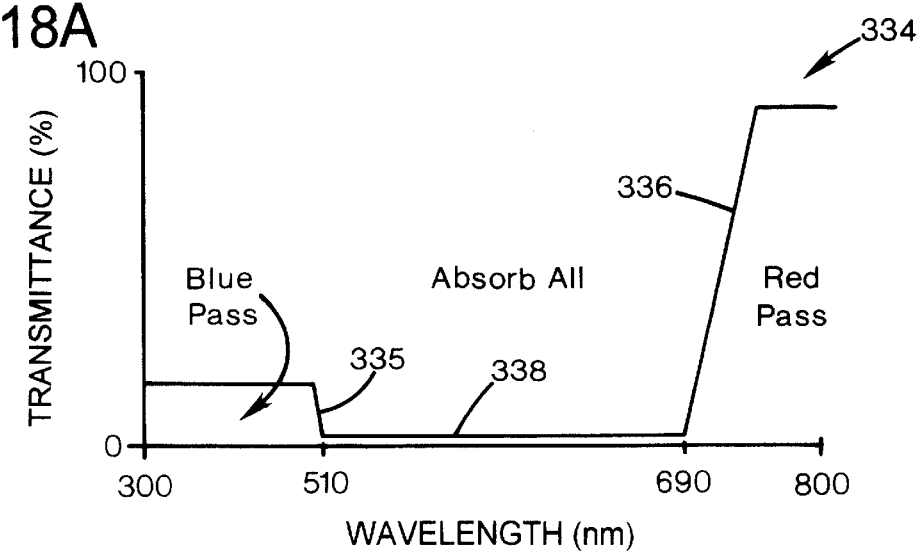
Figure 18B:
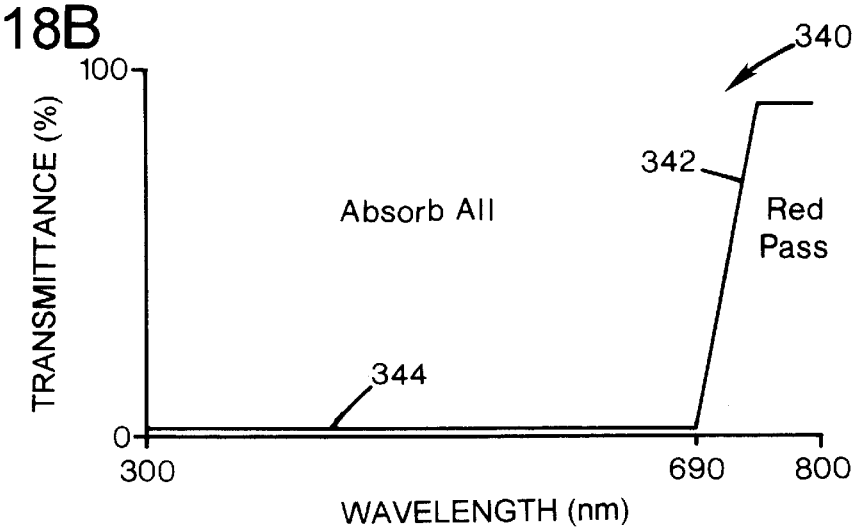
Figure 18C:
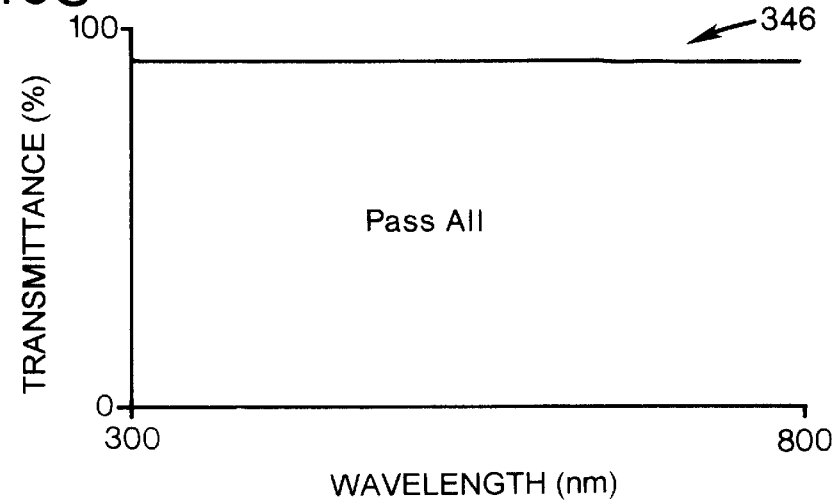

FIGS. 18A–18C show the spectral responses of the various surfaces and zones of the filter element 325. FIG. 18A shows the spectral response of the filter incoming surface 326 as graph 334, which serves as a notch filter to filter out wavelengths other than those of reflected light when illuminated by the blue LED 120 and the red LED 315. This incoming filter surface has a blue pass region 335 where the low wavelength blue LED light, with a peak wavelength of 450–500 nm, passes freely through the filter 325. The curve 334 shows an absorption region 338 where surface 326 absorbs light with wavelengths ranging from about 510–690 nm, so no light within this range propagates to the filter's second surface 328. The incoming filter surface 326 also admits the near-infrared red light with wavelengths over 690 nm, as depicted by region 336 of graph 334. In the illustrated embodiment, the fluorescent ink used to mark the media for type detection is advantageously selected to fluoresce at about 700 nm when illuminated with the red LED 315, which is selected to emit a wavelength of about 680 nm.

FIGS. 18B and 18C show the spectral responses of each zone of the exiting surface 328 of the filter element 325. FIG. 18B shows the spectral response of the outer zone 332 as graph 340, where only the long wavelength near infra-red light emitted from the red LED 315 and reflected from the media type markings is allowed to pass through surface 328, as shown by region 342 of the graph. The outer zone 332 is constructed to absorb all light at wavelengths less than 690 nm, as shown at region 344 of graph 340. FIG. 18C shows the spectral response of the central circular zone 330 as graph 346, through which light of all wavelengths is allowed to pass.

The total spectral response for the central circular zone 330 is the sum of the responses of both the incoming and exiting surfaces 326, 328 of filter 325. Even though the circular zone 330 could pass all wavelengths of light, the spectral response of zone 330 is effectively the same as that of the incoming surface 326, which only allows red light or blue light to propagate to the second surface 328. Moreover, in the illustrated embodiment, the red LED 315 and the blue LED 120 are never illuminated at the same time, so the light passing through the circular zone 330 of the filter will be either all blue or all near infrared.

In the illustrated embodiment, the filter 325 may be constructed from a 1 mm thick sheet of silicon dioxide (glass) using conventional photoresistive masking techniques to apply the various absorptive coatings, as known to those skilled in the art, leaving the incoming surface 326 and the outer zone 332 of the second surface coated, and the circular zone 330 uncoated.

In FIG. 15, for the case of spot sensing function of sensor 300, only blue light from LED 120 is used, so the boundary of the central circular zone 330 becomes a wavelength dependent field stop 330, which provides a circular image for viewing by the photodiode 130, as dictated by the circular shape of zone 330. Thus, the optical filter 325 acts as an optical field stop for the spot sensing function. Referring to FIG. 15, principal light rays 350 for blue light reflecting from the surface of a sheet of media 170" are shown, with these principal rays 350 tracing a path that is at the farthest radial distance in object space that can pass through the center of the aperture stop 322 and not be blocked by the field stop 330 in the image plane. Thus, the principal rays 350 define the field of view of the largest object that can be imaged when illuminated by the blue LED 120, as indicated by dimension X in FIG. 15.

For spot sensing, the filter 325 acts as the field stop, with the central circular zone 330 of the filter 325 being constructed to have a spectral response that transmits approximately 12% of the illumination of the blue LED 120 to the photodiode lens element 166. However, outside the circular zone 330 of the filter 325, the blue light is absorbed. The selected area response of the filter 325 and its position relative to the photodiode 130 functionally makes the filter 325 the field stop limiting the region 108 on the media to a spot that is 1 mm in diameter, as shown for the dimension X in FIG. 15.

In FIG. 15, for the media type detection function of sensor 300, the red light reflected from the pattern on the media 170" when illuminated by the red LED 315 has principal rays 352 which pass through both the circular zone 330 and the outer zone 332 of the filter 325, as well as through the incoming surface 326. The principal rays 352 define the field of view of the largest object that can be imaged when illuminated by the red LED 315, as indicated by dimension Y in FIG. 15. For rectangular opening through a portion of the sensor base 302, as shown in FIG. 17, with the exiting surface 328 of the filter 325 resting against the portion of the base adjacent the stop 324. Thus, the size and shape of the image illuminated by the red LED 315 is dictated by the size and shape of the mechanical field stop 324, while the wavelengths of the image light are dictated by the filter 325.

For media type detection in the illustrated embodiment, the spectral response of the filter 325 is selected to absorb up to 99.99% of the light emitted from the red LED 315. However, the longer wavelength light emanating from the fluorescing ink is readily transmitted through the filter 325 and onto the photodiode lens 135. The rectangular opening 324 may be molded into the base 302 between the filter 325 and photodiode 130, with dimensions of 0.54 mm wide× 1.08 mm tall.

FIG. 15 also shows a trace for marginal rays 354, which are limited by the aperture stop 322 adjacent the lens 305 at the photodiode output lens 168. The marginal rays 354 depict how items within the interior of the boundaries of dimensions X and Y are viewed by the photodiode 130.

In the preferred embodiment the red LED 315 emits light at a peak wavelength of 680 nm with a nominal forward current of 30 mA. The blue LED emits at a peak wavelength of 450 nm at a forward current of 10 mA. The multi-function sensor 300 has an overall height of 23 mm, a thickness of 12 mm and a width of 22 mm. The lens 305 is spaced apart from the media plane by 10 mm and the selected area is 1 mm diameter for the spot sensing and 1 mm×2 mm for media detect sensing. The filter 325 is 3 mm square by 1 mm thick. The photodiode 130 is separated from the lens 305 by 6 mm and has a transresistance of 3.2 giga-ohms. These specifics are merely given by way of example, and it is apparent that other dimensions, arrangement of these elements may be made, such as by using other geometric shapes, sizes and patterns may be used for the optical field stop 330 and for the mechanical field stop 324.

In the unique case, where it is desired for the field of view for the spot function and the media type detection function to be of equal size and shape, the exiting surface 328 may be made totally transmissive by omitting the circular field stop area 330. Omitting the field stop area 330 is best done by eliminating the outer zone 332 with the spectral response of FIG. 18B, and leaving the exiting side of the filter 325 with the spectral response of FIG. 18C. Where the fields of view are the same for both functions, the mechanical field stop 324 serves as the stop for both functions and the total transmissive spectral response of the filter 325 is represented by FIG. 18A. This unique case allows the filter to be placed at an alternate location in the sensor, such as between the photodiode 130 and the lens 305.

Conclusion

Advantageously, the multi-function optical sensing system solves the problems associated with earlier systems having two separate sensors for detecting ink droplet information and media information in the performance of closed-loop inkjet printing functions, allowing delivery of greater performance at a lower cost for consumers. Integrating both sensor functions into a single multi-function sensor 300 directly reduces cost of material, and from a systems standpoint, further savings are realized from reduced inventory and part count. Furthermore, the multi-function sensor 300 is more easily accessible than the earlier separate media detect sensor, if repair or replacement should ever be required. The multi-function sensor also reduces manufacturing overhead when compared to the earlier separate sensor solution. The multi-function sensor is preferably anchored to the carriage 40 with a single screw or other fastener, so the sensor control cable may be easily routed to the circuit board on the carriage 40. This mounting system is in contrast to the two separate installations required for the earlier separate sensors, and the convoluted routing of the cable for the earlier media detect sensor.

In the earlier separate sensor system, it was found that the margin of output signal strength lost due to paper dust accumulation was greater than the loss incurred from ink aerosol. Combining the media detect function within the carriage mounted multi-function sensor 300 exposes the media detect portion of the sensor to more loss due to aerosol but this loss is less than that incurred from paper dust when the earlier sensor was mounted in the paper path. The multi-function sensor 300 therefore has more design margin enabling the use of weaker LEDs, which cost less and may be obtained from a variety of sources, further enhancing the assurance of component supply.

Use of the wavelength dependent filter 325 advantageously allows the multi-function sensor 300 to use a single detector 130 by compensating for the disparate field stops required in this system. Moreover, the filter assembly 320 provides this function without adding complexity to the sensor design, while also saving in direct material and manufacturing overhead costs, while not adversely impacting the assembly process. Furthermore, the filter 325 is a passive component that allows different field stops to be selected by the operating wavelength of the illuminating LED. Additionally, the filter 325 does not need any ancillary controls or power, so the multi-function sensor system is both reliable and robust.

Thus, the multi-function optical sensing system determines information about ink droplets printed on media and about the type of media, allowing the printing mechanism to adjust future printing for optimal images without requiring user intervention. Moreover, this enhanced print quality performance is obtained using an economical sensing system which is more reliable and robust than the earlier separate sensor systems, providing consumers with better print quality in a more economical printing unit.

I claim:

1. A multi-function optical sensing system for sensing ink droplets printed on media by an inkjet printing mechanism and for sensing indicia printed on media indicative of the media type, comprising:

a first illuminating element positionable to illuminate selected portions of the media, wherein the first illuminating element emits light at a first wavelength;

a second illuminating element positionable to illuminate selected portions of the media, wherein the second illuminating element emits light at a second wavelength;

a photodetecting element directed to receive light reflected from the illuminated selected portions of the media, wherein the photodetecting element generates a signal in response to the light received;

a first optical element which defines for the photodetecting element a first geometric pattern of light reflected from the media when illuminated by the first illuminating element, wherein the first optical element comprises an optical filter having a first filter element and a second filter element; and a second optical element which defines for the photodetecting element a second geometric pattern of light reflected from the media when illuminated by the second illuminating element;

wherein the indicia reflects light of a third wavelength when illuminated by the second illuminating element;

wherein the first filter element allows light of the first and third wavelengths to pass therethrough and blocks passage of light of the second wavelength;

wherein the second filter element allows light of the third wavelength to pass therethrough and blocks passage of light of the first and second wavelengths.

2. A multi-function optical sensing system according to claim 1 wherein:

the optical filter allows passage therethrough of light reflected from the media when illuminated by the second illuminating element; and the optical filter restricts passage therethrough of light reflected from the media when illuminated by the first illuminating element to the first geometric pattern.

3. A multi-function optical sensing system according to claim 1 wherein:

the second filter element has one zone which allows said light of the third wavelength to pass therethrough and blocks passage of said light of the first and second wavelengths;

the second filter element has another zone which allows light of all wavelengths to pass therethrough.

4. A multi-function optical sensing system according to claim 3 wherein said one zone and said another zone of the second filter cooperate to define the first geometric pattern of light.

5. A multi-function optical sensing system according to claim 1 wherein:
   these optical filter has an incoming surface facing the media and an exiting surface facing the photodetecting element;
   the first filter element is supported by the incoming surface of the optical filter; and
   the second filter element is supported by the exiting surface of the optical filter.

6. A multi-function optical sensing system according to claim 1 wherein the second optical element comprises a mechanical filter having an opening which defines the second geometric pattern of light.

7. A multi-function optical sensing system according to claim 1:
   further including a controller which receives the signal;
   wherein a first selected portion of the media has no ink so the photodetecting element generates a bare media signal when illuminated by the first illuminating element, and a second selected portion of the media has ink so the photodetecting element generates an ink signal when illuminated by the first illuminating element;
   wherein the controller compares the difference between the amplitudes of the bare media signal and the ink signal to a set of reference values to determine the color of the ink at the second selected portion of the media;
   wherein a third selected portion of the media has said indicia printed thereon so the photodetecting element generates a media type signal when illuminated by the second illuminating element; and
   wherein the controller compares the media type signal and the ink signal to another set of reference values to determine the type of media.

8. A multi-function optical sensing system according to claim 1 wherein:
   the first illuminating element emits a blue light having a peak wavelength selected from 430–500 nanometers;
   the second illuminating element emits a red light having a peak wavelength selected from 650–690 nanometers; and
   the indicia is printed with an ink which reflects the red light at a wavelength of 700–740 nanometers.

9. A multi-function optical sensing system according to claim 1 wherein:
   the first illuminating element comprises a blue light emitting diode;
   the second illuminating element comprises a red light emitting diode;
   the photodetecting element comprises a photodiode;
   first optical element comprises an optical filter; and the second optical element comprises a mechanical filter having an opening which defines the second geometric pattern of light.

10. An inkjet printing mechanism, comprising:
    a media handling system that advances media through a printzone, with the media having indicia printed thereon indicative of the media type;
    a carriage that reciprocates an inkjet printhead across the printzone to selectively deposit ink droplets on the media;
    a multi-function optical sensor supported by the carriage for scanning across the printzone, with the multi-function optical sensor including a first illuminating element and a second illuminating element to selectively illuminate selected portions of the media, a photodetecting element directed to receive light reflected from the illuminated selected portions of the media, with the photodetecting element generating a signal in response to the light received, a first optical element which defines for the photodetecting element a first geometric pattern of light reflected from the media when illuminated by the first illuminating element, and a second optical element which defines for the photodetecting element a second geometric pattern of light reflected from the media when illuminated by the second illuminating element; and
    a controller which compares the signal to a set of reference values to make a determination about ink droplets deposited on the media when illuminated by the first illuminating element, and about said indicia when illuminated by the second illuminating element to determine the type of media;
    wherein the first optical element comprises an optical filter having a first filter element and a second filter element;
    wherein the first illuminating element emits light at a first wavelength;
    wherein the second illuminating element emits light at a second wavelength;
    wherein the indicia reflects light of a third wavelength when illuminated by the second illuminating element;
    wherein the first filter element allows light of the first and third wavelengths to pass therethrough and blocks passage of light of the second wavelength; and
    wherein the second filter element allows light of the third wavelength to pass therethrough and blocks passage of light of the first and second wavelengths.

11. An inkjet printing mechanism according to claim 10 wherein:
    the printing mechanism further includes:
      a media advance detector which generates a media advance signal in response to the position of the media in the printzone; and
      a carriage position detector which generates a carriage position signal in response to the position of the carriage;
    the controller pulses the first illuminating element and the second illuminating element in response to the media advance signal and the carriage position signal.

12. An inkjet printing mechanism according to claim 10 wherein:
    a first selected portion of the media has no ink so the photodetecting element generates a bare media signal;
    a second selected portion of the media has ink so the photodetecting element generates an ink signal;
    the controller compares the difference between the amplitudes of the bare media signal and the ink signal to the set of reference values to determine the color the ink droplets at the second selected portion of the media;
    wherein a third selected portion of the media has said indicia printed thereon so the photodetecting element generates a media type signal when illuminated by the second illuminating element; and wherein the controller compares the media type signal and the ink signal to another set of reference values to determine the type of media.

13. An inkjet printing mechanism according to claim 10 wherein:

the inkjet printhead includes plural inkjet nozzles which eject the ink droplets for deposit on the media in response to a firing signal;

the controller generates the firing signal to deposit a test pattern of ink droplets on the media;

the multi-function optical sensor is scanned across the indicia to generate a media type signal when illuminated by the second illuminating element;

the multi-function optical sensor is scanned across the test pattern to generate a test pattern reflectance signal when illuminated by the first illuminating element; and in response to the test pattern reflectance signal and the media type signal, the controller adjusts the firing signal for ejection of subsequent ink droplets on the media.

* * * * *